US012763362B2

(12) United States Patent
Nakaya et al.

(10) Patent No.: US 12,763,362 B2
(45) Date of Patent: Oct. 13, 2026

(54) MODIFIED SULFIDE SOLID ELECTROLYTE AND MANUFACTURING METHOD THEREFOR

(71) Applicant: IDEMITSU KOSAN CO., LTD., Tokyo (JP)

(72) Inventors: Nobuhito Nakaya, Ichihara (JP); Yusuke Iseki, Chiba (JP); Tomoyuki Okuyama, Ichihara (JP); Hiroto Ida, Chiba (JP); Toshifumi Miyagawa, Chiba (JP); Atsushi Yao, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 599 days.

(21) Appl. No.: 18/271,515

(22) PCT Filed: Jan. 25, 2022

(86) PCT No.: PCT/JP2022/002684
§ 371 (c)(1),
(2) Date: Jul. 10, 2023

(87) PCT Pub. No.: WO2022/163648
PCT Pub. Date: Aug. 4, 2022

(65) Prior Publication Data

US 2024/0079648 A1 Mar. 7, 2024

(30) Foreign Application Priority Data

Jan. 26, 2021 (JP) ................................ 2021-010508

(51) Int. Cl.
*H01M 10/0565* (2010.01)

(52) U.S. Cl.
CPC .................. *H01M 10/0565* (2013.01); *H01M 2300/0082* (2013.01)

(58) Field of Classification Search
CPC .................. H01M 10/0565; H01M 2300/0082
See application file for complete search history.

(56) References Cited

U.S. PATENT DOCUMENTS

2017/0005367 A1 1/2017 Van Berkel et al.
2018/0351202 A1* 12/2018 Choi ................ H01M 10/0525
(Continued)

FOREIGN PATENT DOCUMENTS

JP 2017147173 A 8/2017
JP 2018521173 A 8/2018
(Continued)

OTHER PUBLICATIONS

International Search Report issued Apr. 19, 2022 in PCT/JP2022/002684 (with English translation), 5 pages.
(Continued)

*Primary Examiner* — Sathavaram I Reddy
(74) *Attorney, Agent, or Firm* — Element IP, PLC

(57) ABSTRACT

Provided are a method of manufacturing a modified sulfide solid electrolyte, which is excellent in coating suitability when applied as a paste even if a sulfide solid electrolyte has a large specific surface area, and can efficiently exhibit an excellent battery performance, the modified sulfide solid electrolyte obtained by the manufacturing method, and an electrode combined material and a lithium ion battery which exhibit an excellent battery performance. The method includes: mixing an organic halide and an organic solvent with a sulfide solid electrolyte having a BET specific surface area of 10 $m^2/g$ or more and containing a lithium atom, a sulfur atom, a phosphorus atom, and a halogen atom; and removing the organic solvent.

14 Claims, 1 Drawing Sheet

(56) References Cited

U.S. PATENT DOCUMENTS

| | | | |
|---|---|---|---|
| 2019/0356017 | A1 | 11/2019 | Osada et al. |
| 2022/0173428 | A1 | 6/2022 | Morinaka et al. |

FOREIGN PATENT DOCUMENTS

| | | | |
|---|---|---|---|
| JP | 2019057400 | A | 4/2019 |
| JP | 2019199394 | A | 11/2019 |
| JP | 2020087633 | A | 6/2020 |
| WO | WO-2020203231 | | 10/2020 |
| WO | WO-2020203231 | A1 | 10/2020 |

OTHER PUBLICATIONS

Written Opinion issued Apr. 19, 2022 in PCT/JP2022/002684 (with English translation), 8 pages.
Office Action issued Jun. 17, 2025, in corresponding Japanese Patent Application No. 2022-578408 (with English translation), 7 pages.

* cited by examiner

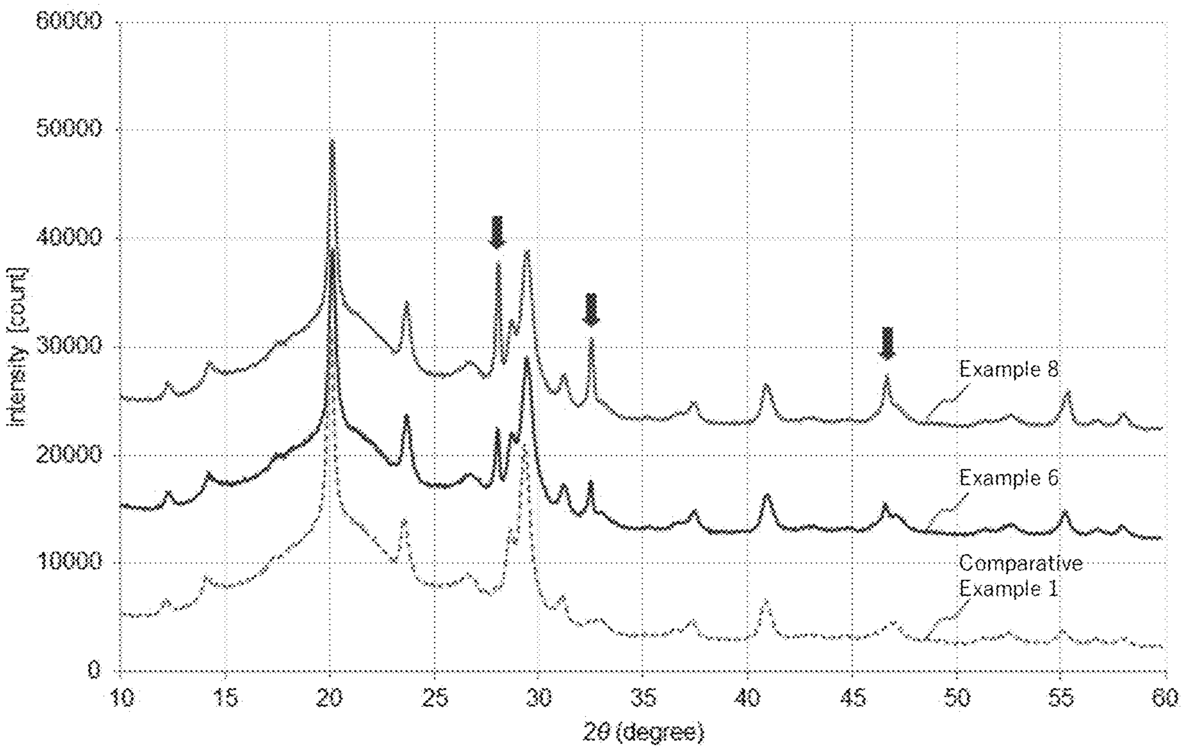
60000
50000
40000
30000
20000
10000
0
intensity [count]
10
15
20
25
30
35
40
45
50
55
60
2θ (degree)
Example 8
Example 6
Comparative
Example 1

MODIFIED SULFIDE SOLID ELECTROLYTE AND MANUFACTURING METHOD THEREFOR

TECHNICAL FIELD

The present invention relates to a modified sulfide solid electrolyte and a manufacturing method therefor.

BACKGROUND ART

In recent years, with the rapid spread of information-related equipment or communication equipment such as PCs, video cameras, and mobile phones, an importance is given to the development of batteries used as a power source therefor. Among them, lithium ion batteries are attracting attention from the viewpoint of high energy density.

In batteries used in such applications, an electrolyte liquid containing a flammable organic solvent has been conventionally used. Thus, it is necessary to provide a safe device that suppresses a temperature rise at the time of short-circuit, and to improve structures and materials for preventing the short-circuit. Meanwhile, when the electrolyte liquid is replaced with a solid electrolyte so as to make an all solid battery, since a flammable organic solvent is not used within the battery, simplification of a safe device can be achieved, thereby improving a manufacturing cost and productivity. Thus, batteries in which an electrolyte liquid is replaced with a solid electrolyte layer are being developed.

As for a solid electrolyte used for a solid electrolyte layer, a sulfide solid electrolyte has been conventionally known, and there is a primary demand for improvement of ionic conductivity in the sulfide solid electrolyte. For example, in order to improve the ionic conductivity, a production method of a composite solid electrolyte has been proposed, in which the surface of a sulfide-based solid electrolyte is covered with a predetermined halogenated hydrocarbon compound as a coating material (see. e.g., PTL 1).

Further, as a technique of covering the surface, for example, a solid electrolyte composition has been proposed, in which a coating is formed on the surface of the solid electrolyte by a compound having a C═O bond, and a compound having a S═O bond, so that the affinity between active materials used for a negative electrode, a positive electrode and the like and the sulfide solid electrolyte is increased in the manufacturing of lithium ion batteries, thereby improving cycle characteristics (see, e.g., PTL 2). Further, PTL 3 discloses a sulfide solid electrolyte that contains a lithium element, a phosphorus element, and a sulfur element, and also contains an ester compound of carboxylic acid and alcohol, in which the ester compound is bound to or adsorbed on the surface of the conductive sulfide, thereby improving cycle characteristics of a solid battery. Further, the sulfide solid electrolyte is obtained by a manufacturing method including a step of wet pulverizing a slurry containing a lithium ion conductive sulfide, an organic solvent, and an ester compound. In this way, in recent years, in order to practically use lithium ion batteries, in addition to simple improvement of the ionic conductivity of a sulfide solid electrolyte itself, demands for other performance improvements are diversifying. Then, in order to meet such demands, a technique of covering the surface is applied.

CITATION LIST

Patent Literature

PTL 1: JP 2020-87633 A
PTL 2: JP 2017-147173 A

PTL 3: International publication No. 2020/203231 pamphlet

SUMMARY OF INVENTION

Technical Problem

The present invention has been made in view of such circumstances, and an object thereof is to provide a modified sulfide solid electrolyte, which is excellent in coating suitability when applied as a paste even if a sulfide solid electrolyte has a large specific surface area and can efficiently exhibit an excellent battery performance, and a manufacturing method thereof. Another object of the present invention is to provide an electrode combined material and a lithium ion battery which exhibit an excellent battery performance.

Solution to Problem

A method of manufacturing a modified sulfide solid electrolyte according to the present invention is a modified sulfide solid electrolyte manufacturing method which includes:

mixing an organic halide and an organic solvent with a sulfide solid electrolyte having a BET specific surface area of 10 $m^2/g$ or more and containing a lithium atom, a sulfur atom, a phosphorus atom, and a halogen atom; and removing the organic solvent.

A modified sulfide solid electrolyte according to the present invention is obtained by the modified sulfide solid electrolyte manufacturing method, and the modified sulfide solid electrolyte includes the organic halide, or a compound containing a hydrocarbon group derived from the organic halide.

Further, a modified sulfide solid electrolyte according to the present invention is obtained by the modified sulfide solid electrolyte manufacturing method, and the modified sulfide solid electrolyte includes a lithium halide formed by a halogen atom derived from the organic halide, and a lithium atom derived from the sulfide solid electrolyte.

An electrode combined material according to the present invention is an electrode combined material including the modified sulfide solid electrolyte according to the present invention, and an electrode active material.

Further, a lithium ion battery according to the present invention is a lithium ion battery including at least one of the modified sulfide solid electrolyte according to the present invention and the electrode combined material according to the present invention.

Advantageous Effects of Invention

According to the present invention, it is possible to provide a manufacturing method of a modified sulfide solid electrolyte that is excellent in coating suitability when applied as a paste, and can efficiently exhibit an excellent battery performance, and the modified sulfide solid electrolyte. Further, according to the present invention, it is possible to provide an electrode combined material and a lithium ion battery which exhibit an excellent battery performance.

BRIEF DESCRIPTION OF DRAWINGS

FIG. 1 is X-ray diffraction spectra of sulfide solid electrolytes obtained in Examples 6 and 8 and Comparative Example 1.

DESCRIPTION OF EMBODIMENTS

Hereinafter, an embodiment of the present invention (hereinafter, referred to as "the present embodiment" in some cases) will be described. The present invention is not limited to the following embodiment, and can be arbitrarily modified in implementation in a range where the effects of the invention are not imp aired.

Further, in the present specification, regarding the numerical value ranges of "or more", "or less", and "to", numerical values of an upper limit and a lower limit are numerical values which can be arbitrarily combined, and further, numerical values in Examples can also be used as the numerical values of the upper limit and the lower limit. For example, when a certain numerical value range is described as "A to B" and "C to D", numerical value ranges such as "A to D" and "C to B" are also included.

Findings Obtained by the Present Inventors Until the Present Invention is Achieved The present inventors have conducted intensive studies in order to solve the above problems, and as a result, they have found the following matters, and have completed the present invention.

As in PTLs 1 to 3, a technique of covering the surface of the sulfide solid electrolyte with a certain compound has conventionally existed. PTLs 1 to 3 aim to improve ionic conductivity by using the technique, and aim to improve a battery performance, such that the affinity between active materials used for a negative electrode, a positive electrode and the like, and the sulfide solid electrolyte is increased in the manufacturing of lithium ion batteries, and then cycle characteristics are improved.

By the way, in the manufacturing process of a lithium ion battery (also referred to as an "all solid state battery"), a paste is prepared by mixing a solid electrolyte, other predetermined components and a solvent, and the paste is applied to form a separator layer, and an electrode combined material layer. In order to improve the performance of these layers, it is necessary to improve the density of the solid electrolyte constituting these layers. In improving the density, the use of a solid electrolyte with a large specific surface area is effective.

In this way, there is a demand to use a solid electrolyte with a large specific surface area. Then, when the specific surface area of the solid electrolyte is large, the viscosity of the paste is increased, resulting in a manufacturing problem in that the coating suitability is significantly reduced. Meanwhile, if a large amount of solvent is used, the viscosity of the paste is reduced, and then it is possible to improve the coating suitability of the paste. However, this causes problems such as a battery performance deterioration due to a prolongation of a drying time, or a density reduction of the layer-forming solid electrolyte. Therefore, the coating suitability of the paste, and obtaining a high battery performance have an antinomic relationship. Further, if a sulfide solid electrolyte with a large specific surface area of 10 $m^2/g$ or more is made into the paste, the viscosity is increased. Then, the coating suitability is significantly reduced, and moreover, in order to lower the viscosity of the paste, a large amount of solvents are required. Thus, due to the drying time prolongation, and the density reduction, the battery performance significantly deteriorates.

As already mentioned, until now, as in PTLs 1 to 3, a large number of studies aimed at improving the ionic conductivity, and the battery performance have been conducted. However, under the circumstances where the practical use of lithium ion batteries is rapidly progressing, with a focus on mass production, the fact that no examination has been conducted on a method of improving the performance in the manufacturing process, such as the coating suitability of a paste, has attracted attention.

The present inventors have continuously conducted intensive studies with a focus on a compound for covering the surface, while following a technique disclosed in PTLs 1 and 2 in which the surface of a sulfide solid electrolyte is covered with a certain compound. As a result, they have found that even with a sulfide solid electrolyte having a large specific surface area of 10 $m^2/g$ or more, at least by mixing the sulfide solid electrolyte with an organic halide, it is possible to obtain the sulfide solid electrolyte that is excellent in coating suitability when applied as a paste, and is capable of efficiently exhibiting an excellent battery performance. When the sulfide solid electrolyte is mixed with the organic halide, the organic halide, or a hydrocarbon group derived from the organic halide adheres to or reacts with the sulfide solid electrolyte. Accordingly, even when a sulfide solid electrolyte having a large specific surface area of 10 $m^2/g$ or more is applied as a paste, an effect of excellent coating suitability is obtained. This is an astonishing phenomenon that has never been recognized until now.

In the present specification, a "solid electrolyte" means an electrolyte kept as a solid at 25° C. under a nitrogen atmosphere. A "sulfide solid electrolyte" obtained by a manufacturing method of the present embodiment is a solid electrolyte containing a lithium atom, a sulfur atom, a phosphorus atom, and a halogen atom, and having an ionic conductivity caused by the lithium atom.

The "sulfide solid electrolyte" includes both a crystalline sulfide solid electrolyte having a crystal structure, and an amorphous sulfide solid electrolyte. In the present specification, the crystalline sulfide solid electrolyte is a solid electrolyte in which solid electrolyte-derived peaks are observed in the X-ray diffraction pattern in powder X-ray diffraction (XRD) measurement. In these, the presence/absence of a peak derived from a raw material of the solid electrolyte is not related to this material. That is, the crystalline sulfide solid electrolyte contains a crystal structure derived from the solid electrolyte, in which a part of the crystal structure may be derived from the solid electrolyte, or the crystal structure may be entirely derived from the solid electrolyte. Then, as long as the crystalline sulfide solid electrolyte has the X-ray diffraction pattern as mentioned above, a part thereof may contain an amorphous sulfide solid electrolyte (also referred to as a "glass component"). Therefore, the crystalline sulfide solid electrolyte contains so-called glass ceramics obtained by heating the amorphous solid electrolyte (glass component) to a crystallization temperature or higher.

Further, in the present specification, the amorphous sulfide solid electrolyte (glass component) has a halo pattern in which peaks other than material-derived peaks are not substantially observed in the X-ray diffraction pattern in the powder X-ray diffraction (XRD) measurement. This means that it does not matter whether there is a peak derived from a raw material of the solid electrolyte.

The distinction between crystallinity and amorphousness is applied to both the sulfide solid electrolyte, and the modified sulfide solid electrolyte in the present embodiment.

A method of manufacturing a modified sulfide solid electrolyte according to a first aspect of the present embodiment is a modified sulfide solid electrolyte manufacturing method which includes:

mixing an organic halide and an organic solvent with a sulfide solid electrolyte having a BET specific surface area of 10 $m^2/g$ or more and containing a lithium atom, a sulfur atom, a phosphorus atom, and a halogen atom; and removing the organic solvent.

As for the sulfide solid electrolyte containing a lithium atom, a sulfur atom, a phosphorus atom, and a halogen atom, sulfide solid electrolytes obtained by using raw materials that can be obtained through a conventional method, for example, raw materials such as lithium sulfide, cliphosphorus pentasulfide, lithium halide, and a single halogen substance, may be typically exemplified. It can be said that the modified sulfide solid electrolyte manufacturing method of the present embodiment is a manufacturing method using a sulfide solid electrolyte having a large specific surface area, in which a BET specific surface area is 10 $m^2/g$ or more in a conventional method.

In a conventional sulfide solid electrolyte having a large specific surface area, i.e., a BET specific surface area of 10 $m^2/g$, a paste that is contained in an amount required for securing a solid electrolyte density in a layer to exhibit a predetermined battery performance, had a significantly reduced coating performance. Then, it has been extremely difficult to efficiently form a positive electrode, a negative electrode, and an electrolyte layer. In the present embodiment, at least the sulfide solid electrolyte and the organic halide are mixed so that the organic halide, or a hydrocarbon group derived from the organic halide adheres or reacts to/with the sulfide solid electrolyte. Due to this phenomenon, the affinity between the electrolyte surface and the organic solvent is improved, so that oil absorption can be reduced. That is, it is thought that due to "modification", the sulfide solid electrolyte has become one that should be called a "modified sulfide solid electrolyte".

It is known that the relationship between adhesion and coating suitability is related to oil absorption as well as the specific surface area. According to Examples and Comparative Examples to be described below, it has been confirmed that the modified sulfide solid electrolyte of the present embodiment has a lower oil absorption than the sulfide solid electrolyte with no adhesion, and at the same time, it has been confirmed that the coating suitability is improved.

Although it is unknown whether the cause is intermolecular interactions, or reactions, it is thought that when the organic halide adheres or reacts to/with the surface of the sulfide solid electrolyte, the oil absorption can be reduced, and the coating suitability is improved, and as a result, the battery performance is improved.

In the modified sulfide solid electrolyte manufacturing method according to a second aspect of the present embodiment, as for the organic halide, at least one compound selected from an organic halide 1 represented by the general formula (1), an organic halide 2 represented by the general formula (2), an organic halide 3 represented by the general formula (3) and an organic halide 4 represented by the general formula (4) is used. In the organic halides represented by the general formulas (1) to (4), the halogen atom in $X^{11}$, $X^{21}$, $X^{31}$ and $X^{41}$ is an atom selected from a chlorine atom, a bromine atom, and an iodine atom. In consideration of the fact that no peak caused by fluorine can be confirmed in the modified sulfide solid electrolyte obtained by the manufacturing method of the present embodiment, it is thought that the "adhesion or reaction" is caused by $X^{11}$, $X^{21}$, $X^{31}$ and $X^{41}$ whose halogen atom is an atom selected from a chlorine atom, a bromine atom, and an iodine atom or a group other than these in a case where the group other than these has a halogen atom other than fluorine. Detailed descriptions on the organic halides represented by the general formulas (1) to (4), including this phenomenon, will be made below.

As already mentioned, the organic halides adhere to the surface of the sulfide solid electrolyte, thereby reducing oil absorption, and improving coating suitability. Among these, the organic halides 1 to 4 represented by the general formulas (1) to (4) easily adhere to the surface of the sulfide solid electrolyte, and thus an effect of reducing oil absorption, and improving coating suitability is easily obtained.

In the modified sulfide solid electrolyte manufacturing method according to a third aspect of the present embodiment, the halogen atom included in the organic halide in the first aspect and the second aspect is at least one selected from a chlorine atom, a bromine atom, and an iodine atom.

As already mentioned, as for the organic halide, the organic halides 1 to 4 represented by the general formulas (1) to (4) to be described below may be preferably exemplified. When the halogen atom contained in these organic halides is at least one selected from a chlorine atom, a bromine atom, and an iodine atom, adhesion to the surface of the sulfide solid electrolyte is easy, and thus an effect of reducing oil absorption, and improving coating suitability is easily obtained.

As illustrated in these general formulas (1) to (4), one organic halide may contain one halogen atom, or may contain two or more types of halogen atoms. Further, two or more types of halogen atoms may be supplied to the sulfide solid electrolyte by using two or more types of organic halides each containing one halogen atom, or may be supplied by using one organic halide containing two or more types of halogen atoms.

In the modified sulfide solid electrolyte manufacturing method according to a fourth aspect of the present embodiment, the organic halide in the first to third aspects is the organic halide 1 of the general formula (1), in which $X^{11}$ is a halogen atom, $X^{12}$ is a monovalent aliphatic hydrocarbon group having 2 to 24 carbon atoms, and $X^{13}$ and $X^{14}$ are hydrogen atoms.

Among the organic halides 1 represented by the general formula (1), those defined in the fourth aspect more easily adhere to the surface of the sulfide solid electrolyte, and thus it is easy to improve coating suitability, and it is easy to efficiently exhibit an excellent battery performance.

In the modified sulfide solid electrolyte manufacturing method according to a fifth aspect of the present embodiment, the organic halide in the first to fourth aspects is the organic halide 2 of the general formula (2), in which each of $X^{21}$ to $X^{26}$ is independently a hydrogen atom, a halogen atom or a monovalent halogenated hydrocarbon group in which at least one hydrogen atom is substituted with a halogen atom, and at least one of $X^{21}$ to $X^{26}$ is a halogenated hydrocarbon group.

Among the organic halides 2 represented by the general formula (2), those defined in the fifth aspect more easily adhere to the surface of the sulfide solid electrolyte, and thus it is easy to improve coating suitability, and it is easy to efficiently exhibit an excellent battery performance.

In the modified sulfide solid electrolyte manufacturing method according to a sixth aspect of the present embodiment, the organic halide in the first to fifth aspects is the organic halide 3 of the general formula (3), in which $X^{31}$ is a halogen atom, and $X^{32}$ is a monovalent aliphatic hydrocarbon group having 2 or more carbon atoms or a group represented by the general formula (3a).

Among the organic halides 3 represented by the general formula (3), those defined in the sixth aspect more easily adhere to the surface of the sulfide solid electrolyte, and thus it is easy to improve coating suitability, and it is easy to efficiently exhibit an excellent battery performance.

In the modified sulfide solid electrolyte manufacturing method according to a seventh aspect of the present embodiment, the organic halide in the first to sixth aspects is the organic halide 4 of the general formula (4), in which $X^{41}$ is a group represented by a halogen atom, and $X^{42}$ to $X^{44}$ are monovalent aliphatic hydrocarbon groups.

Among the organic halides 4 represented by the general formula (4), those defined in the seventh aspect more easily adhere to the surface of the sulfide solid electrolyte, and thus it is easy to improve coating suitability, and it is easy to efficiently exhibit an excellent battery performance.

In the modified sulfide solid electrolyte manufacturing method according to an eighth aspect of the present embodiment, the organic solvent used in the first to seventh manufacturing methods is at least one solvent selected from an aliphatic hydrocarbon solvent, an alicyclic hydrocarbon solvent, an aromatic hydrocarbon solvent, an ester-based solvent, a nitrile-based solvent and an ether-based solvent.

The use of the solvents as the organic solvent promotes adhesion of the organic halide to the surface of the sulfide solid electrolyte, and the solvents are easily removed, and thus the modified sulfide solid electrolyte is efficiently obtained.

In the modified sulfide solid electrolyte manufacturing method according to a ninth aspect of the present embodiment, regarding the usage amount of the organic halide in the first to eighth manufacturing methods, the organic halide accounts for 0.05 parts by mole or more and 3.5 parts by mole or less in 100 parts by mole of sulfur atoms contained in the sulfide solid electrolyte.

The use of 0.05 parts by mole or more and 3.5 parts by mole or less of the organic halide efficiently causes the adhesion of the organic halide. Thus, oil absorption can be reduced, and the coating suitability can be improved. Further, the ionic conductivity of the modified sulfide solid electrolyte itself is improved.

A modified sulfide solid electrolyte according to a tenth aspect of the present embodiment is a modified sulfide solid electrolyte which is obtained by any one of the manufacturing methods, and includes the organic halide, or a compound containing a hydrocarbon group derived from the organic halide.

As already mentioned, in the modified sulfide solid electrolyte manufacturing method of the present embodiment, when the sulfide solid electrolyte is mixed with the organic halide, a phenomenon occurs in which the organic halide, or a hydrocarbon group derived from the organic halide adheres or reacts to/with the sulfide solid electrolyte. That is, the modified sulfide solid electrolyte of the present embodiment is obtained by the modified sulfide solid electrolyte manufacturing method of the present embodiment, and has a compound including a compound containing a hydrocarbon group, which is formed by adhesion of the organic halide used in the manufacturing method, or the hydrocarbon group derived from the organic halide, to the sulfide solid electrolyte.

A modified sulfide solid electrolyte according to an eleventh aspect of the present embodiment is a modified sulfide solid electrolyte which is obtained by any one of the manufacturing methods, and includes a lithium halide formed by a halogen atom derived from the organic halide, and a lithium atom derived from the sulfide solid electrolyte.

Regarding the modified sulfide solid electrolyte according to the tenth and eleventh aspects, as already mentioned, the modified sulfide solid electrolyte is obtained through adhesion or reaction of the organic halide to/with the surface of the sulfide solid electrolyte, and the "adhesion" is considered to be caused by intermolecular interactions, and may be either adhesion or reaction. In the manufacturing method according to any of the first to ninth aspects, the sulfide solid electrolyte and the organic halide are mixed, and then due to the effect of adhesion or reaction caused by the organic halide, the oil absorption of the sulfide solid electrolyte is reduced, and the coating suitability is improved. Therefore, the modified sulfide solid electrolyte according to the tenth and eleventh aspects of the present embodiment is based on the premise that it is obtained by any one of the manufacturing methods, that is, the premise that due to the mixing of the sulfide solid electrolyte and the organic halide, the organic halide adheres or reacts to/with the surface of the sulfide solid electrolyte.

The modified sulfide solid electrolyte according to the eleventh aspect of the present embodiment has a lithium halide formed by a halogen atom derived from the organic halide, and a lithium atom derived from the sulfide solid electrolyte.

As will be confirmed in Examples to be described below, according to powder X-ray diffraction (XRD) measurement of the modified sulfide solid electrolyte, a peak derived from the lithium halide is detected. Meanwhile, no peak derived from the lithium halide is detected in the sulfide solid electrolyte (obtained by using a lithium halide) used for forming the modified sulfide solid electrolyte. Therefore, it is expected that the detected lithium halide is a by-product in the reaction between the organic halide, or a hydrocarbon group derived from the organic halide and the sulfide solid electrolyte.

Further, the organic halide is a compound mainly containing a hydrogen atom, a carbon atom, and a halogen atom, and does not contain a lithium atom. It is thought that this phenomenon indicates that the lithium halide confirmed by XRD measurement on the modified sulfide solid electrolyte according to the present embodiment is formed by a halogen atom derived from the organic halide, and a lithium atom derived from the sulfide solid electrolyte, and then the modified sulfide solid electrolyte is obtained by using the organic halide.

In the modified sulfide solid electrolyte according to a twelfth aspect of the present embodiment, the BET specific surface area is 10 $m^2/g$ or more in the tenth or eleventh aspect.

As will be described below, the BET specific surface area of the modified sulfide solid electrolyte and the BET specific surface area of the sulfide solid electrolyte are substantially the same. Since the BET specific surface area of the sulfide solid electrolyte used in the modified sulfide solid electrolyte manufacturing method of the present embodiment is 10 $m^2/g$ or more, the BET specific surface area of the obtained modified sulfide solid electrolyte naturally becomes 10 $m^2/g$ or more.

An electrode combined material according to a thirteenth aspect of the present embodiment includes the modified sulfide solid electrolyte of any one of the tenth to twelfth aspects, and an electrode active material.

Further, a lithium ion battery according to a fourteenth aspect of the present embodiment includes at least one of the modified sulfide solid electrolyte of any one of the tenth to twelfth and the electrode combined material of the thirteenth aspect.

As already mentioned, the modified sulfide solid electrolyte of the present embodiment is excellent in coating suitability when applied as a paste, and can efficiently exhibit an excellent battery performance. Therefore, the electrode combined material, which includes the modified sulfide solid electrolyte of the present embodiment, is also excellent in coating suitability, and thus, the lithium ion battery can be efficiently produced. Then, the obtained lithium ion battery has an excellent battery performance.

Manufacturing Method of Modified Sulfide Solid Electrolyte

A method of manufacturing a modified sulfide solid electrolyte according to the present embodiment is characterized in that the manufacturing method of the modified sulfide solid electrolyte includes: mixing an organic halide, and an organic solvent with a sulfide solid electrolyte having a BET specific surface area of 10 $m^2/g$ or more, and containing a lithium atom, a sulfur atom, a phosphorus atom, and a halogen atom; and removing the organic solvent.

Sulfide Solid Electrolyte

Descriptions will be made on the sulfide solid electrolyte for forming the modified sulfide solid electrolyte of the present embodiment. The sulfide solid electrolyte that can be used in the present embodiment can be used with no particular limitation as long as it contains a lithium atom, a sulfur atom, a phosphorus atom, and a halogen atom, and has a BET specific surface area of 10 $m^2/g$ or more. A commercially available product can be used as it is, or those obtained through manufacturing can be used.

Regarding a case where the sulfide solid electrolyte that can be used in the present embodiment is produced for use, a manufacturing method thereof will be described. The sulfide solid electrolyte that can be used in the present embodiment is obtained by, for example, a manufacturing method that includes mixing two or more raw materials selected from compounds containing at least one atom of a lithium atom, a sulfur atom, a phosphorus atom, and a halogen atom.

Raw Materials

As for the raw materials, two or more compounds selected from compounds containing at least one atom of a lithium atom, a sulfur atom, a phosphorus atom, and a halogen atom can be adopted.

The compound that can be used as the raw material contains at least one atom of a lithium atom, a sulfur atom, a phosphorus atom, and a halogen atom. More specifically, raw materials containing at least two atoms selected from the four atoms, for example, lithium sulfides; lithium halides such as lithium fluoride, lithium chloride, lithium bromide, and lithium iodide; alkali metal halides such as sodium halides such as sodium iodide, sodium fluoride, sodium chloride, and sodium bromide; phosphorus sulfides such as diphosphorus trisulfide ($P_2S_3$), and diphosphorus pentasulfide ($P_2S_5$); phosphorus halides such as various phosphorus fluorides ($PF_3$, $PF_5$), various phosphorus chlorides ($PCl_3$, $PCl_5$, $P_2Cl_4$), various phosphorus bromides ($PBr_3$, $PBr_5$), and various phosphorus iodides ($PI_3$, $P_2I_4$); and thiophosphoryl halides such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), and single halogen substances such as fluorine ($F_2$), chlorine ($Cl_2$), bromine ($Br_2$), and iodine ($I_2$), preferably bromine ($Br_2$), and iodine ($I_2$), may be representatively exemplified.

A compound that can be used as a raw material other than those mentioned above is, for example, a compound containing at least one atom selected from the four atoms and containing an atom other than the four atoms. More specific examples thereof include lithium compounds such as lithium oxide, lithium hydroxide, and lithium carbonate; alkali metal sulfides such as sodium sulfide, potassium sulfide, rubidium sulfide, and cesium sulfide; metal sulfides such as silicon sulfide, germanium sulfide, boron sulfide, gallium sulfide, tin sulfide (SnS, $SnS_2$), aluminum sulfide, and zinc sulfide; phosphoric acid compounds such as sodium phosphate, and lithium phosphate; metal halides such as aluminum halide, silicon halide, germanium halide, arsenic halide, selenium halide, tin halide, antimony halide, tellurium halide, and bismuth halide; and phosphorus oxyhalides such as phosphorus oxychloride ($POCl_3$), and phosphorus oxybromide ($POBr_3$).

In the present embodiment, from the viewpoint of more easily obtaining the sulfide solid electrolyte having a high ionic conductivity, among halogen atoms, a chlorine atom, a bromine atom, and an iodine atom are preferable, and a bromine atom, and an iodine atom are more preferable. Further, these atoms may be used alone, or in combination of two or more types. That is, for an example of lithium halide, lithium bromide may be used alone, lithium iodide may be used alone, or lithium bromide and lithium iodide may be used in combination.

Further, from the same viewpoint, as for the compound that can be used for the raw material, among those mentioned above, preferred are lithium sulfides; phosphorus sulfides such as diphosphorus trisulfide ($P_2S_3$), and diphosphorus pentasulfide ($P_2S_5$); single halogen substances such as fluorine ($F_2$), chlorine ($Cl_2$), bromine ($Br_2$), and iodine ($I_2$); and lithium halides such as lithium fluoride, lithium chloride, lithium bromide, and lithium iodide. Among phosphorus sulfides, diphosphorus pentasulfide is preferable, among single halogen substances, chlorine ($Cl_2$), bromine ($Br_2$), and iodine ($I_2$) are preferable, and among lithium halides, lithium chloride, lithium bromide, and lithium iodide are preferable.

As the combination of compounds that can be used for the raw materials, for example, preferred are a combination of lithium sulfide, diphosphorus pentasulfide and lithium halide, and a combination of lithium sulfide, diphosphorus pentasulfide and a single halogen substance. As for the lithium halide, lithium bromide, lithium iodide, and lithium chloride are preferable, and as for the single halogen substance, chlorine, bromine and iodine are preferable.

When lithium sulfide is used as a compound containing a lithium atom in the present embodiment, the lithium sulfide is preferably a particle.

The average particle size ($D_{50}$) of lithium sulfide particles is preferably 10 μm or more and 2000 μm or less, more preferably 30 μm or more and 1500 μm or less, further preferably 50 μm or more and 1000 μm or less. In the present specification, the average particle size ($D_{50}$) is a particle diameter at a point where 50% of the total is reached when a particle diameter distribution cumulative curve is drawn and a sequential cumulation is made from the particle having the smallest particle diameter, and the volume distribution refers to, for example, an average particle size that can be measured by using a laser diffraction/scattering particle diameter distribution measuring device. Further, among the above-exemplified raw materials, the solid raw material preferably has an average particle size on the same level as the lithium sulfide particles. That is, it preferably has an average particle size falling within the same range as that of the lithium sulfide particles.

When lithium sulfide, diphosphorus pentasulfide, and lithium halide are used as the raw materials, the ratio of lithium sulfide to the total of lithium sulfide and diphosphorus pentasulfide is preferably 60 mol % or more, more preferably 65 mol % or more, further preferably 68 mol % or more from the viewpoint of obtaining higher chemical stability, and the viewpoint of improving a $PS_4$ fraction and obtaining high ionic conductivity. The upper limit is preferably 80 mol % or less, more preferably 78 mol % or less, further preferably 76 mol % or less.

When lithium sulfide, diphosphorus pentasulfide, lithium halide, and other raw materials to be used as necessary are used, the content of lithium sulfide and diphosphorus pentasulfide relative to the total of these is preferably 60 mol % or more, more preferably 65 mol % or more, further preferably 70 mol % or more. The upper limit is preferably 100 mol % or less, more preferably 90 mol % or less, further preferably 80 mol % or less.

Further, when a combination of lithium bromide and lithium iodide is used as lithium halide, from the viewpoint of improving a $PS_4$ fraction, and obtaining high ionic conductivity, the ratio of lithium bromide to the total of lithium bromide and lithium iodide is preferably 1 mol % or more, more preferably 20 mol % or more, further preferably 40 mol % or more, still further preferably 50 mol % or more. The upper limit is preferably 99 mol % or less, more preferably 90 mol % or less, further preferably 80 mol % or less, still further preferably 70 mol % or less.

When a single halogen substance is used as the raw material and when lithium sulfide, and diphosphorus pentasulfide are used, relative to the total number of moles of lithium sulfide and diphosphorus pentasulfide excluding lithium sulfide having the same number of moles as the number of moles of the single halogen substance, the ratio of the number of moles of lithium sulfide excluding lithium sulfide having the same number of moles as the number of moles of the single halogen substance preferably falls within a range of 60 to 90%, more preferably falls within a range of 65 to 85%, further preferably falls within a range of 68 to 82%, still more preferably falls within a range of 72 to 78%, particularly preferably falls within a range of 73 to 77%. This is because at these ratios, higher ionic conductivity is obtained. Further, from the viewpoint similar to this, when lithium sulfide, diphosphorus pentasulfide, and a single halogen substance are used, the content of the single halogen substance relative to the total amount of lithium sulfide, diphosphorus pentasulfide, and the single halogen substance is preferably 1 to 50 mol %, more preferably 2 to 40 mol %, further preferably 3 to 25 mol %, still more preferably 3 to 15 mol %.

When lithium sulfide, diphosphorus pentasulfide, a single halogen substance, and lithium halide are used, relative to the total amount of these, the content (α mol %) of the single halogen substance and the content (ß mol %) of lithium halide preferably satisfy the following formula (1), more preferably satisfy the following formula (2), further preferably satisfy the following formula (3), still more preferably satisfy the following formula (4).

$$2 \leq 2\alpha + \beta \leq 100 \quad (1)$$

$$4 \leq 2\alpha + \beta \leq 80 \quad (2)$$

$$6 \leq 2\alpha + \beta \leq 50 \quad (3)$$

$$6 \leq 2\alpha + \beta \leq 30 \quad (4)$$

Mixing

The mixing of the two or more raw materials selected from compounds containing at least one atom of a lithium atom, a sulfur atom, a phosphorus atom, and a halogen atom can be carried out by using, for example, a mixer for the raw materials. Further, this can be carried out by using an agitator, a pulverizer and the like.

This is because even if the agitator is used, the raw materials can be mixed, and if the pulverizer is used, the raw materials are pulverized, and at the same time, they are also mixed. That is, regarding the sulfide solid electrolyte used in the present embodiment, it can also be said that agitation, mixing, pulverization, or a combination of any of these processes can be carried on the two or more raw materials selected from compounds containing at least one atom of a lithium atom, a sulfur atom, a phosphorus atom, and a halogen atom.

As an agitator or a mixer, for example, a mechanical agitation-type mixer capable of stirring with agitation blades provided within a reaction tank (this may also be referred to as mixing by agitation, or agitation mixing) may be exemplified. Examples of the mechanical agitation-type mixer include a high-speed agitation type mixer, and a double-arm type mixer. Further, as for the high-speed agitation type mixer, a vertical shaft rotary mixer, a horizontal shaft rotary mixer and the like may be exemplified, and any mixer may be used.

As for the shape of the agitation blade used in the mechanical agitation-type mixer, a blade type, an arm type, an anchor type, a paddle type, a full zone type, a ribbon type, a multistage-blade type, a double arm type, a shovel type, a twin-shaft blade type, a flat blade type, a C-type blade type and the like may be exemplified. From the viewpoint of more efficiently promoting the reaction of raw materials, a shovel type, a flat blade type, a C-type blade type, an anchor type, a paddle type, a full zone type and the like are preferable, and an anchor type, a paddle type, and a full zone type are more preferable.

When the mechanical agitation-type mixer is used, the number of rotations of the agitation blade may be appropriately adjusted according to the volume and temperature of a fluid in the reaction tank, the shape of the agitation blade and the like, and is not particularly limited, but is usually about 5 rpm or more and 400 rpm or less. From the viewpoint of more efficiently promoting the reaction of raw materials, it is preferably 10 rpm or more and 300 rpm or less, more preferably 15 rpm or more and 250 rpm or less, further preferably 20 rpm or more and 200 rpm or less.

When mixing is performed by using a mixer, the temperature condition is not particularly limited, and is usually, for example, −30 to 120° C., preferably −10 to 100° C., more preferably 0 to 80° C., further preferably 10 to 60° C.

Further, the mixing time is usually 0.1 to 500 hours, and is preferably 1 to 450 hours, more preferably 10 to 425 hours, further preferably 20 to 400 hours, still further preferably 40 to 375 hours from the viewpoint of making the raw material dispersion state more uniform and promoting the reaction.

A method of performing mixing accompanied by pulverization by using a pulverizer is a method that has been conventionally adopted as a solid-phase method (mechanical milling method). As for the pulverizer, for example, a medium-type pulverizer using a pulverization medium can be used.

Medium-type pulverizers are roughly divided into container driven pulverizers, and medium agitation-type pulverizers. Examples of the container-driven pulverizer include an agitating tank, a pulverizing tank, and a combination of these, such as a ball mill and a bead mill. Further, examples of the medium agitation-type pulverizer include: impact-type pulverizers such as a cutter mill, a hammer mill, and a pin mill; tower-type pulverizers such as a tower mill; agitating tank-type pulverizers such as an attritor, an aquamizer, and a sand grinder; flow tank-type pulverizers such as a visco mill and a pearl mill; flow pipe-type pulverizers; annular pulverizers such as a coball mill; continuous dynamic pulverizers; and various pulverizers such as single-screw or multi-screw kneaders. Among them, in terms of the ease of particle size adjustment of obtained sulfide, the ball mill and the bead mill exemplified as the container-driven pulverizer are preferable, and among these, a planetary one is preferable.

These pulverizers can be appropriately selected according to a desired scale and the like. For a relatively small scale, container-driven pulverizers such as a ball mill and a bead mill can be used, and in a case of a large scale or mass production, other types of pulverizers may be used.

Further, as will be described below, in the case of a liquid state or a slurry state accompanied by a liquid, such as a solvent, during mixing, a wet pulverizer that can handle wet pulverization is preferable.

Typical examples of the wet pulverizer include a wet bead mill, a wet ball mill, and a wet vibration mill, and the wet bead mill using beads as a pulverization medium is preferable because it is possible to freely adjust conditions for a pulverizing operation, and it is easy to handle smaller particle sizes. Further, it is also possible to use dry pulverizers, e.g., dry medium-type pulverizers such as a dry bead mill, a dry ball mill, and a dry vibration mill, and dry non-medium pulverizers such as a jet mill.

Further, when a mixing target is in a liquid state, or a slurry state, a flow-type pulverizer can also be used, which can perform a circulating operation through circulation as necessary. Specifically, for example, such a pulverizer may have a mode of circulation between a pulverizer of pulverizing slurry (pulverization mixer), and a temperature keeping bath (reaction vessel).

The size of beads and balls used in the ball mill and the bead mill may be appropriately selected according to a desired particle size, a throughput and the like. For example, the diameter of beads is usually 0.05 mmφ or more, preferably 0.1 mmφ or more, more preferably 0.3 mmφ or more, and the upper limit is usually 5.0 mmφ or less, preferably 3.0 mmφ or less, more preferably 2.0 mmφ or less. Further, the diameter of balls is usually 2.0 mmφ or more, preferably 2.5 mmφ or more, more preferably 3.0 mmφ or more, and the upper limit is usually 20.0 mmφ or less, preferably 15.0 mmφ or less, more preferably 10.0 mmφ or less.

Further, examples of the material include: metals such as stainless steel, chrome steel, and tungsten carbide; ceramics such as zirconia, and silicon nitride; and minerals such as agate.

Further, when the ball mill and the bead mill are used, the number of rotations varies depending on the scale of the processing, and thus cannot be generalized. However, it is usually 10 rpm or more, preferably 20 rpm or more, more preferably 50 rpm or more, and the upper limit is usually 1,000 rpm or less, preferably 900 rpm or less, more preferably 800 rpm or less, further preferably 700 rpm or less.

Further, in this case, the pulverization time varies depending on the scale of the processing, and thus cannot be generalized. However, it is usually 0.5 hour or more, preferably 1 hour or more, more preferably 5 hours or more, further preferably 10 hours or more, and the upper limit is usually 100 hours or less, preferably 72 hours or less, more preferably 48 hours or less, further preferably 36 hours or less.

By selecting the size and material of the medium (beads, balls) to be used, the number of rotations of a rotor, the time and the like, it is possible to perform mixing, agitation, pulverization, or a combination of any of these processes, and then it is possible to adjust the particle size and the like of the sulfide to be obtained.

Solvent

In the mixing, a solvent can be added to and mixed with the raw materials. As for the solvent, various solvents that are widely called organic solvents can be used.

As the solvent, it is possible to widely employ solvents that have been conventionally used in the production of solid electrolytes. For example, hydrocarbon solvents such as an aliphatic hydrocarbon solvent, an alicyclic hydrocarbon solvent, and an aromatic hydrocarbon solvent may be exemplified.

Examples of the aliphatic hydrocarbon include hexane, pentane, 2-ethylhexane, heptane, octane, decane, undecane, dodecane, and tridecane, examples of the alicyclic hydrocarbon include cyclohexane, and methylcyclohexane, and examples of the aromatic hydrocarbon solvent include benzene, toluene, xylene, mesitylene, ethylbenzene, tert-butylbenzene, trifluoromethylbenzene, and nitrobenzene.

Further, besides the hydrocarbon solvents, solvents containing atoms other than a carbon atom, and a hydrogen atom, e.g., hetero atoms such as a nitrogen atom, an oxygen atom, a sulfur atom, and a halogen atom, may also be exemplified. Such a solvent has a property of easy formation of a complex with compounds that are used as raw materials and contain a lithium atom, a phosphorus atom, a sulfur atom, and a halogen atom (hereinafter, such a solvent is also referred to as a "complexing agent"). It is useful in that higher ionic conductivity is obtained due to its property that allows a halogen atom to easily remain within the structure of the sulfide solid electrolyte. Preferable examples of such a complexing agent include not only, for example, an ether solvent, and an ester solvent which contain an oxygen atom as a hetero atom, but also an alcohol solvent, an aldehyde solvent, and a ketone solvent.

Preferable examples of the ether solvent include: aliphatic ethers such as dimethylether, cliethylether, tert-butylmethylether, dimethoxymethane, dimethoxyethane, cliethyleneglycol dimethylether (diglyme), triethyleneoxideglycol dimethylether (triglyme), and diethyleneglycol, triethyleneglycol; alicyclic ethers such as ethyleneoxide, propyleneoxide, tetrahydrofuran, tetrahydropyran, dimethoxy tetrahydrofuran, cyclopentyl methylether, and dioxane; heterocyclic ethers such as furan, benzofuran, and benzopyran; and aromatic ethers such as methylphenyl ether (anisole), ethylphenyl ether, clibenzylether, and diphenyl ether.

Preferable examples of the ester solvent include: methyl formate, ethyl formate, methyl acetate, ethyl acetate, propyl acetate, isopropyl acetate; aliphatic esters such as methyl propionate, ethyl propionate, dimethyl oxalate, diethyl oxalate, dimethyl malonate, diethyl malonate, dimethyl succinate, and diethyl succinate; alicyclic esters such as cyclohexane carboxylic acid methyl, cyclohexane carboxylic acid ethyl, and cyclohexane dicarboxylic acid dimethyl; heterocyclic esters such as pyridine carboxylic acid methyl, pyrimidine carboxylic acid methyl, acetolactone, propiolactone, butyrolactone, and valerolactone; and aromatic esters such as methyl benzoate, ethyl benzoate, dimethyl phthalate, diethyl phthalate, butylbenzyl phthalate, clicyclohexyl phthalate, trimethyl trimellitate, and triethyl trimellitate.

Further, alcohol solvents such as ethanol, and butanol; aldehyde solvents such as formaldehyde, acetaldehyde, and dimethylformamide; and ketone solvents such as acetone, and methylethylketone may be preferably exemplified.

As a solvent containing a nitrogen atom as a hetero atom, solvents having a nitrogen atom-containing group such as an amino group, an amide group, a nitro group, or a nitrile group may be exemplified.

Preferable examples of the solvent having the amino group include: aliphatic amines such as ethylenediamine, cliaminopropane, dimethylethylene diamine, diethyl ethylene diamine, dimethyl diamino propane, tetramethyl diamino methane, tetramethyl ethylene diamine (TMEDA), and tetramethyl diamino propane (TMPDA); alicyclic amines such as cyclopropane diamine, cyclohexane diamine, and bisaminomethyl cyclohexane; heterocyclic amines such as isophorone diamine, piperazine, clipiperidyl propane, and dimethyl piperazine; and aromatic amines such as phenyl diamine, tolylene diamine, naphthalene diamine, methyl phenylene diamine, dimethyl naphthalene diamine, dimethyl phenylene diamine, tetramethyl phenylene diamine, and tetramethyl naphthalene diamine.

Nitrile solvents such as acetonitrile and acrylonitrile; and nitrogen atom-containing solvents such as dimethylformamide, and nitrobenzene may also be preferably exemplified.

As a solvent containing a halogen atom as a hetero atom, dichloromethane, chlorobenzene, trifluoromethylbenzene, chlorobenzene, chlorotoluene, bromobenzene and the like may be preferably exemplified.

Further, as a solvent containing a sulfur atom, dimethyl sulfoxide, carbon disulfide and the like may be preferably exemplified.

When a solvent is used, the amount of the solvent in use is preferably 100 mL or more with respect to the total amount 1 kg of raw materials, more preferably 200 mL or more, further preferably 250 mL or more, still further preferably 300 mL or more. The upper limit is preferably 3000 mL or less, more preferably 2500 mL or less, further preferably 2000 mL or less, still further preferably 1550 mL or less. When the amount of the solvent in use falls within the above range, the raw materials can be efficiently reacted.

Drying

In a case where the mixing is performed by using the solvent, after the mixing is performed, drying a fluid (usually, a slurry) obtained through the mixing may be included. In the case of the use of a complexing agent as a solvent, the complexing agent is removed from a complex containing the complexing agent, in the case of combined use of a complexing agent and a solvent, the complexing agent is removed from a complex containing the complexing agent, and the solvent is removed, or in the case of the use of a solvent other than a complexing agent, the solvent is removed so that the sulfide solid electrolyte is obtained. The obtained sulfide solid electrolyte exhibits ionic conductivity caused by a lithium atom.

The drying of the fluid obtained through the mixing can be performed at a temperature depending on the type of the solvent. For example, it can be performed at a temperature equal to or higher than a boiling point of the complexing agent.

Further, usually at 5 to 100° C., preferably at 10 to 85° C., more preferably at 15 to 70° C., still further preferably at about room temperature (23° C.) (e.g., about room temperature ±5° C.), drying (vacuum drying) under reduced pressure can be performed by using a vacuum pump or the like so as to volatilize the complexing agent and the solvent used as necessary.

The drying may be performed by subjecting the fluid to filtration using a glass filter or the like, solid-liquid separation by decantation, or solid-liquid separation using a centrifugal separator or the like. When a solvent other than a complexing agent is used, the sulfide solid electrolyte is obtained through solid-liquid separation. Further, when a complexing agent is used as a solvent, after solid-liquid separation is performed, drying is performed under the temperature conditions so as to remove the complexing agent incorporated in the complex.

Specifically, the solid-liquid separation is easily performed through decantation, in which after the fluid is transferred to a container, and the sulfide (or a complex (which can also be referred to as a precursor of the sulfide solid electrolyte) in a case where a complexing agent is included) precipitates, a complexing agent and a solvent which become a supernatant are removed, or through filtration using, for example, a glass filter having a pore size of about 10 to 200 μm, preferably 20 to 150 μm.

After the mixing is performed, the drying may be performed before the hydrogen treatment to be described below is performed, or may be performed after the hydrogen treatment is performed.

The sulfide solid electrolyte obtained by performing the mixing, or the sulfide solid electrolyte obtained by removing a solvent through the drying in the case of use of the solvent exhibits ionic conductivity caused by a lithium atom.

The sulfide solid electrolyte obtained by performing the mixing basically becomes an amorphous sulfide solid electrolyte (glass component), for example, unless mixing by pulverization is performed by using a pulverizer to such an extent that crystallization is performed.

The sulfide solid electrolyte obtained by performing the mixing may be an amorphous sulfide solid electrolyte (glass component), or a crystalline sulfide solid electrolyte, which can be appropriately selected as desired. In production of the crystalline sulfide solid electrolyte, the crystalline sulfide solid electrolyte can be obtained by heating the amorphous sulfide solid electrolyte obtained through the mixing.

As a result of, for example, the treatment such as pulverization to be described below for the purpose of adjusting the powder particle size of the crystalline sulfide solid electrolyte, the sulfide solid electrolyte may also include a crystalline sulfide solid electrolyte having a surface on which an amorphous component (glass component) is formed. Therefore, an amorphous component-containing sulfide solid electrolyte includes an amorphous sulfide solid electrolyte, and also a sulfide solid electrolyte that is a crystalline sulfide solid electrolyte and has a surface on which an amorphous component is formed.

Heating

In the case of production of a crystalline sulfide solid electrolyte, heating may be further included. When an amorphous sulfide solid electrolyte (glass component) is obtained by the mixing, a crystalline sulfide solid electrolyte is obtained by heating. Further, when the crystalline sulfide solid electrolyte is obtained, a crystalline sulfide solid electrolyte having a more improved crystallinity is obtained.

Further, when a complexing agent is used as a solvent during the mixing, a complex containing the complexing agent is formed. The complexing agent is removed from the complex by heating without the drying, so that a sulfide solid electrolyte is obtained. This can be amorphous or crystalline according to heating conditions.

For example, when an amorphous sulfide solid electrolyte is obtained, the heating temperature may be determined according to the structure of a crystalline sulfide solid electrolyte to be obtained by heating the amorphous sulfide solid electrolyte, Specifically, when the amorphous sulfide solid electrolyte is subjected to differential thermal analysis (DTA) using a differential thermal analysis device (DTA device) at a temperature rise condition of 10° C./min, the heating temperature may be determined preferably in a range of 5° C. or less from a starting point that is a peak top temperature of an exothermic peak observed on the lowest temperature side, more preferably of 10° C. or less, further preferably of 20° C. or less. The lower limit is not particularly limited, but may be about −40° C. or more from the peak top temperature of the exothermic peak observed on the lowest temperature side. By setting this temperature range, the amorphous sulfide solid electrolyte is more efficiently and reliably obtained. The heating temperature in obtaining the amorphous sulfide solid electrolyte various depending on the structure of the crystalline sulfide solid electrolyte to be obtained, and thus cannot be generally defined, but is usually preferably 135° C. or less, more preferably 130° C. or less, further preferably 125° C. or less. The lower limit is not particularly limited, but is preferably 90° C. or more, more preferably 100° C. or more, further preferably 105° C. or more.

Further, when a crystalline sulfide solid electrolyte is obtained by heating an amorphous sulfide solid electrolyte, the heating temperature may be determined according to the structure of the crystalline sulfide solid electrolyte, and is preferably higher than the heating temperature for obtaining the amorphous sulfide solid electrolyte. Specifically, when the amorphous sulfide solid electrolyte is subjected to differential thermal analysis (DTA) using a differential thermal analysis device (DTA device) at a temperature rise condition of 10° C./min, the temperature may be determined preferably in a range of 5° C. or more from a starting point that is a peak top temperature of an exothermic peak observed on the lowest temperature side, more preferably of 10° C. or more, further preferably of 20° C. or more. The upper limit is not particularly limited, but may be about 40° C. or less. By setting this temperature range, the crystalline sulfide solid electrolyte is more efficiently and reliably obtained. The heating temperature in obtaining the crystalline sulfide solid electrolyte various depending on the composition and structure of the crystalline sulfide solid electrolyte to be obtained, and thus cannot be generally defined, but is usually preferably 130° C. or more, more preferably 135° C. or more, further preferably 140° C. or more. The upper limit is not particularly limited, but is preferably 600° C. or less, more preferably 550° C. or less, further preferably 500° C. or less.

The heating time is not particularly limited as long as a desired amorphous sulfide solid electrolyte and a crystalline sulfide solid electrolyte are obtained, but the time is, for example, preferably 1 minute or more, more preferably 10 minutes or more, further preferably 30 minutes or more, still further preferably 1 hour or more. Further, the upper limit of the heating time is not particularly limited, but is preferably 24 hours or less, more preferably 10 hours or less, further preferably 5 hours or less, still further preferably 3 hours or less.

Further, the heating is preferably performed in an inert gas atmosphere (e.g., a nitrogen atmosphere, a argon atmosphere), or a reduced pressure atmosphere (especially in a vacuum). It may be an inert gas atmosphere containing hydrogen at a constant concentration, for example, the hydrogen concentration in the hydrogen treatment to be described below. This is because deterioration (for example, oxidation) of the crystalline sulfide solid electrolyte can be prevented.

The heating method is not particularly limited, but examples thereof include methods using a hot plate, a vacuum heating device, an argon gas atmosphere furnace, and a firing furnace. Further, industrially, a lateral dryer having a heating means and a feed mechanism, a lateral vibrating fluid dryer and the like can also be used, and may be selected according to the throughput of a heating.

The sulfide solid electrolyte obtained through the method is an amorphous (glass component) or crystalline sulfide solid electrolyte containing a lithium atom, a sulfur atom, a phosphorus atom, and a halogen atom, and is suitably used as a sulfide solid electrolyte in the manufacturing method of the present embodiment.

BET Specific Surface Area

The BET specific surface area of the sulfide solid electrolyte used in the manufacturing method of the present embodiment is 10 $m^2/g$ or more. The modified sulfide solid electrolyte of the present embodiment has such a large specific surface area, but exhibits effects in that it is excellent in coating suitability when applied as a paste, and efficiently exhibits an excellent battery performance. The larger the BET specific surface area of the sulfide solid electrolyte, the further the superiority of the effect can be exhibited. From this viewpoint, the BET specific surface area is preferably 12 $m^2/g$ or more, more preferably 15 $m^2/g$ or more, further preferably 20 $m^2/g$ or more. From the similar viewpoint, the upper limit is not particularly limited, but is practically 100 $m^2/g$ or less, preferably 75 $m^2/g$ or less, more preferably 50 $m^2/g$ or less.

In the present specification, the BET specific surface area is a specific surface area measured by using krypton as an adsorbate in accordance with JIS Z 8830:2013 (a specific surface area measurement method of powder (solid) by gas adsorption).

Amorphous Sulfide Solid Electrolyte

The amorphous sulfide solid electrolyte obtained by the method contains a lithium atom, a sulfur atom, a phosphorus atom, and a halogen atom. Typical preferred examples thereof include: solid electrolytes including lithium sulfide, phosphorus sulfide and lithium halide such as, for example, $Li_2S—P_2S_5—LiI$, $Li_2S—P_2S_5—LiCl$, $Li_2S—P_2S_5—LiBr$, and $Li_2S—P_2S_5—LiI—LiBr$; and solid electrolytes containing other atoms such as an oxygen atom, and a silicon atom, such as, for example, $Li_2S—P_2S_5—Li_2O—LiI$, and $Li_2S—SiS_2—P_2S_5—LiI$. From the viewpoint of obtaining higher ionic conductivity, solid electrolytes including lithium sulfide, phosphorus sulfide, and lithium halide such as $Li_2S—P_2S_5—LiI$, $Li_2S—P_2S_5—LiCl$, $Li_2S—P_2S_5—LiBr$, and $Li_2S—P_2S_5—LiI—LiBr$ may be preferably exemplified.

The types of atoms forming the amorphous sulfide solid electrolyte can be confirmed by, for example, an ICP emission spectroscopy device.

The shape of the amorphous sulfide solid electrolyte is not particularly limited, but, for example, a granular shape may be exemplified. For example, the average particle size ($D_{50}$) of the granular amorphous sulfide solid electrolyte can fall within ranges of, for example, 0.01 μm to 500 μm, and 0.1 to 200 μm.

Crystalline Sulfide Solid Electrolyte

The crystalline sulfide solid electrolyte obtained by the method may be so-called glass ceramics obtained by heating the amorphous solid electrolyte at a crystallization temperature or higher. Examples of its crystal structure include a $Li_3PS_4$ crystal structure, a $Li_4P_2S_6$ crystal structure, a $Li_7PS_6$ crystal structure, a $Li_7P_3S_{11}$ crystal structure, and a crystal structure having peaks near 2θ=20.2° and near 23.6° (e.g., JP 2013-16423 A).

Further, examples thereof include: a $Li_{4-x}Ge_{1-x}P_xS_4$-based thio-LISICON Region II type crystal structure (see Kanno et al., Journal of The Electrochemical Society, 148(7) A742-746(2001)), and a crystal structure similar to the $Li_{4-x}Ge_{1-x}P_xS_4$-based thio-LISICON Region II type (see Solid State Ionics, 177(2006), 2721-2725)). Among the above, the thio-LISICON Region II type crystal structure is preferable as the crystal structure of the crystalline sulfide solid electrolyte obtained by the manufacturing method of the present embodiment from the viewpoint of obtaining higher ionic conductivity. Here, the "thio-LISICON Region II type crystal structure" refers to either the $Li_{4-x}Ge_{1-x}P_xS_4$-based thio-LISICON Region II type crystal structure, or the crystal structure similar to the $Li_{4-x}Ge_{1-x}P_xS_4$-based thio-LISICON Region II type. Further, the crystalline sulfide solid electrolyte obtained by the manufacturing method of the present embodiment may have the thio-LISICON Region II type crystal structure, or may have it as a main crystal. However, from the viewpoint of obtaining higher ionic conductivity, it is preferable to have it as a main crystal. In the present specification, "having as a main crystal" means that the ratio of the target crystal structure accounts for 80% or more in the crystal structure, preferably for 90% or more, more preferably for 95% or more. Further, from the viewpoint of obtaining higher ionic conductivity, the crystalline sulfide solid electrolyte obtained by the manufacturing method of the present embodiment preferably does not contain crystalline $Li_3PS_4$(ß—$Li_3PS_4$).

In the X-ray diffraction measurement using a CuKα ray, diffraction peaks of the $Li_3PS_4$ crystal structure appear near, for example, 2θ=17.5°, 18.3°, 26.1°, 27.3°, and 30.0°, diffraction peaks of the $Li_4P_2S_6$ crystal structure appear near, for example, 2θ=16.9°, 27.1°, and 32.5°, diffraction peaks of the $Li_7PS_6$ crystal structure appear near, for example, 2θ=15.3°, 25.2°, 29.6°, and 31.0°, diffraction peaks of the $Li_7P_3S_{11}$ crystal structure appear near, for example, 2θ=17.8°, 18.5°, 19.7°, 21.8°, 23.7°, 25.9°, 29.6°, and 30.0°, diffraction peaks of the $Li_{4-x}Ge_{1-x}P_xS_4$-based thio-LISICON Region II type crystal structure appear near, for example, 2θ=20.1°, 23.9°, and 29.5°, and diffraction peaks of the crystal structure similar to the $Li_{4-x}Ce_{1-x}P_xS_4$-based thio-LISICON Region II type appear near, for example, 2θ=20.2, and 23.6°. Such a peak position may be smaller or larger within a range of ±0.5°.

As described above, when the thio-LISICON Region II type crystal structure is obtained in the present embodiment, it is preferable that the crystalline $Li_3PS_4$(ß—$Li_3PS_4$) is not included. The sulfide solid electrolyte obtained through the production method does not have diffraction peaks at 2θ=17.5° and 26.1° observed for the crystalline $Li_3PS_4$. Otherwise, even in a case where those are included, the detected peaks are very smaller than the diffraction peak of the thio-LISICON Region II type crystal structure.

A crystal structure having the structural skeleton of $Li_7PS_6$ and represented by a composition formula $Li_{7-x}P_{1-y}Si_yS_6$ or $Li_{7-x}P_{1-y}Si_yS_6$ (x is −0.6 to 0.6, and y is 0.1 to 0.6) in which a part of P is replaced with Si is cubic or orthorhombic, preferably cubic, and has peaks mainly appearing at positions 2θ=15.5°, 18.0°, 25.0°, 30.0°, 31.4°, 45.3°, 47.0°, and 52.0° in the X-ray diffraction measurement using a CuKα ray. A crystal structure represented by the composition formula $Li_{7-x-2y}PS_{6-x-y}Cl_x$ (0.8≤x≤1.7, 0<y≤−0.25x+0.5) is preferably cubic, and has peaks mainly appearing at positions 2θ=15.5°, 18.0°, 25.0°, 30.0°, 31.4°, 45.3°, 47.0°, and 52.0° in the X-ray diffraction measurement using a CuKα ray. Further, a crystal structure represented by the composition formula $Li_{7-x}PS_{6-x}Ha_x$ (Ha is Cl or Br, and x is preferably 0.2 to 1.8) is preferably cubic, and has peaks mainly appearing at positions 2θ=15.5°, 18.0°, 25.0°, 30.0°, 31.4°, 45.3°, 47.0°, and 52.0° in the X-ray diffraction measurement using a CuKα ray. These crystal structures basically having structural skeletons of $Li_7PS_6$ are also referred to as argyrodite-type crystal structures.

Such a peak position may be smaller or larger within a range of ±0.5°.

The shape of the crystalline sulfide solid electrolyte is not particularly limited, but, for example, a granular shape may be exemplified. For example, the average particle size ($D_{50}$) of the granular crystalline sulfide solid electrolyte can fall within ranges of, for example, 0.01 μm to 500 μm, and 0.1 to 200 μm.

Organic Halide

The organic halide is not particularly limited as long as it is a halogen atom-containing organic compound, and preferable examples thereof include organic halides 1 to 4 represented by the following general formulas (1) to (4), respectively, from the viewpoint of more efficiently allowing the organic halide, or a hydrocarbon group derived from the organic halide to adhere to or react with the surface of the sulfide solid electrolyte, thereby reducing oil absorption, and improving the coating suitability.

(1)

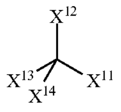

-continued (2)

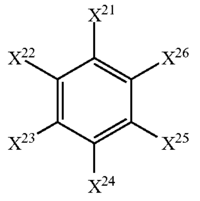

(3)

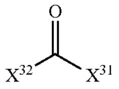

(3a)

$—R^{31}—OR^{32}$ (4)

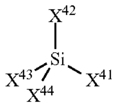

Organic Halide 1

The organic halide 1 is a compound represented by the following general formula (1).

(1)

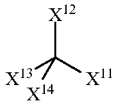

In the general formula (1), $X^{11}$ is a halogen atom, each of $X^{12}$ to $X^{14}$ is independently a hydrogen atom, a halogen atom, a monovalent aliphatic hydrocarbon group or a monovalent alicyclic hydrocarbon group, and a hydrogen atom in the monovalent aliphatic hydrocarbon group and the monovalent alicyclic hydrocarbon group may be substituted with a halogen atom. Further, the halogen atom for $X^{11}$ is an atom selected from a chlorine atom, a bromine atom, and an iodine atom, and the halogen atom for $X^{12}$ to $X^{14}$ is an atom selected from a fluorine, a chlorine atom, a bromine atom, and an iodine atom.

The halogen atom for $X^{11}$ is an atom selected from a chlorine atom, a bromine atom, and an iodine atom as described above, preferably a bromine atom, or an iodine atom, more preferably an iodine atom. Further, the halogen atom for $X^{12}$ to $X^{14}$ is an atom selected from a fluorine, a chlorine atom, a bromine atom, and an iodine atom as described above, and chlorine, bromine, and iodine are more preferable. When two or more of $X^{11}$ to $X^{14}$ are halogen atoms, the halogen atoms may be the same or different.

As already mentioned, when the organic halide 1 is used, it is thought that the adhesion or reaction to/with the sulfide solid electrolyte is mainly caused by X. Further, when the halogen atom in $X^{12}$ to $X^{14}$ is other than a fluorine atom, it is thought that this may be caused by $X^{12}$ to $X^{14}$ in some cases. Further, the fact that this may be caused by $X^{12}$ to $X^{14}$ in some cases is also similarly applied to a case to be described below in which the hydrocarbon group is substituted with the halogen atom. Further, when $X^{11}$ is a hydrocarbon group such as an aliphatic hydrocarbon group or an alicyclic hydrocarbon group, which will be described below, it is thought that the adhesion is caused by the hydrocarbon group of $X^{11}$. Further, when $X^{12}$ to $X^{14}$ are hydrocarbon groups, it is thought that this may be caused by $X^{12}$ to $X^{14}$ in some cases.

Preferable examples of the monovalent aliphatic hydrocarbon group for $X^{12}$ to $X^{14}$ include an alkyl group, and an alkenyl group, and the alkyl group is preferable. The number of carbon atoms of the aliphatic hydrocarbon group is, preferably 1 or more, more preferably 2 or more, further preferably 3 or more in the case of the alkyl group, and the upper limit is preferably 24 or less, more preferably 16 or less, further preferably 12 or less. Further, it is 2 or more, preferably 3 or more in the case of the alkenyl group, and the upper limit is preferably 24 or less, more preferably 16 or less, further preferably 12 or less.

The aliphatic hydrocarbon group for $X^{12}$ to $X^{14}$ may be linear or branched, and its hydrogen atom may be substituted with a halogen atom. This may be substituted with a hydroxy group or the like. In the case of substitution with the halogen atom, since the halogen atom for $X^{12}$ to $X^{14}$ is defined to be an atom selected from a fluorine atom, a chlorine atom, a bromine atom, and an iodine atom, as for the halogen atom, the same as the halogen atoms for $X^{12}$ to $X^{14}$ can be exemplified. Further, when two or more of $X^{12}$ to $X^{14}$ are aliphatic hydrocarbon groups, the aliphatic hydrocarbon groups may be the same or different.

Preferable examples of the monovalent alicyclic hydrocarbon group for $X^{12}$ to $X^{14}$ include a cycloalkyl group, and a cycloalkenyl group, and the cycloalkyl group is preferable. The number of carbon atoms of the alicyclic hydrocarbon group is 3 or more, preferably 4 or more, and the upper limit is preferably 12 or less, more preferably 8 or less, further preferably 6 or less.

The alicyclic hydrocarbon group for $X^{12}$ to $X^{14}$ may have a hydrogen atom substituted with a halogen atom, or may be partially substituted with a hydroxy group, the monovalent aliphatic hydrocarbon group (e.g., an alkyl group, an alkenyl group) and the like. In the case of substitution with the halogen atom, since the halogen atom for $X^{12}$ to $X^{14}$ is defined to be an atom selected from a fluorine atom, a chlorine atom, a bromine atom, and an iodine atom, as for the halogen atom substituting for the hydrocarbon of $X^{12}$ to $X^{14}$, the same as those exemplified as the halogen atom for $X^{12}$ to $X^{14}$ are preferably exemplified. Further, when two or more of $X^{12}$ to $X^{14}$ are alicyclic hydrocarbon groups, the alicyclic hydrocarbon groups may be the same or different.

Among the organic halides 1 represented by the general formula (1), preferred is a compound in which $X^{11}$ is a halogen atom, $X^{12}$ is a monovalent aliphatic hydrocarbon group having 2 to 24 carbon atoms, and $X^{13}$ and $X^{14}$ are hydrogen atoms. Here, as already mentioned, the halogen atom is preferably a chlorine atom, a bromine atom, or an iodine atom, the monovalent aliphatic hydrocarbon group is preferably an alkyl group, the number of carbon atoms of the alkyl group is preferably 2 or more, more preferably 3 or more, and the upper limit is preferably 16 or less, more preferably 12 or less.

Organic Halide 2

The organic halide 2 is a compound represented by the following general formula (2).

(2)

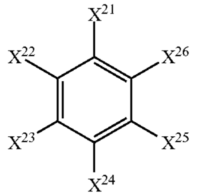

In the general formula (2), each of $X^{21}$ to $X^{26}$ is independently a hydrogen atom, a halogen atom, a monovalent aliphatic hydrocarbon group or a monovalent alicyclic hydrocarbon group, and a hydrogen atom in the monovalent aliphatic hydrocarbon group and the monovalent alicyclic hydrocarbon group of $X^{21}$ to $X^{26}$ may be substituted with a halogen atom. At least one of $X^{21}$ to $X^{26}$ is a halogen atom or a group containing a halogen atom. Further, the halogen atom for $X^{21}$ is an atom selected from a chlorine atom, a bromine atom, and an iodine atom, and the halogen atom for $X^{22}$ to $X^{26}$ is an atom selected from a fluorine, a chlorine atom, a bromine atom, and an iodine atom.

As the halogen atom for $X^{21}$, those described as the halogen atom for $X^{11}$ are preferably exemplified, and as the halogen atom for $X^{22}$ to $X^{26}$, the same as those described as the halogen atom for $X^{12}$ to $X^{14}$ are preferably exemplified. As for the halogen atom of $X^{22}$ to $X^{26}$, a fluorine atom is more preferable. When two or more of $X^{21}$ to $X^{26}$ are halogen atoms, the halogen atoms may be the same or different.

As already mentioned, when the organic halide 2 is used, it is thought that the adhesion or reaction to/with the sulfide solid electrolyte is mainly caused by $X^{21}$. Further, when the halogen atom in $X^{22}$ to $X^{26}$ is other than a fluorine atom, it is thought that this may be caused by $X^{22}$ to $X^{26}$ in some cases. Further, the fact that this may be caused by $X^{22}$ to $X^{26}$ in some cases is also similarly applied to a case to be described below in which the hydrocarbon group is substituted with the halogen atom. Further, when $X^{21}$ is a hydrocarbon group such as an aliphatic hydrocarbon group, or an alicyclic hydrocarbon group, which will be described below, it is thought that the adhesion is caused by the hydrocarbon group of $X^{21}$. Further, when $X^{22}$ to $X^{26}$ are hydrocarbon groups, it is thought that this may be caused by $X^{22}$ to $X^{26}$ in some cases.

As for the monovalent aliphatic hydrocarbon group and the alicyclic hydrocarbon group for $X^{21}$ to $X^{26}$, the same as the monovalent aliphatic hydrocarbon groups, and the alicyclic hydrocarbon groups for $X^{12}$ to $X^{14}$ are preferably exemplified, and the aliphatic hydrocarbon group is preferable.

The monovalent aliphatic hydrocarbon group is preferably an alkyl group, or an alkenyl group, and the alkyl group is more preferable. In the case of the alkyl group, the number of carbon atoms is preferably 1 or more, and the upper limit is preferably 24 or less, more preferably 12 or less, further preferably 8 or less, still further preferably 2 or less. In the case of the alkenyl group, the number of carbon atoms is preferably 2 or more, and the upper limit is the same as in the alkyl group. Further, these may be linear or branched like the monovalent aliphatic hydrocarbon group and the monovalent alicyclic hydrocarbon group of $X^{12}$ to $X^{14}$. When two or more of $X^{22}$ to $X^{26}$ are aliphatic hydrocarbon groups, or alicyclic hydrocarbon groups, the aliphatic hydrocarbon groups, or the alicyclic hydrocarbon groups may be the same or different.

The monovalent aliphatic hydrocarbon group of $X^{21}$ to $X^{26}$ may have a hydrogen atom substituted with a halogen atom, or may be substituted with a hydroxy group, and the like. The alicyclic hydrocarbon group may have a hydrogen atom substituted with a halogen atom, or may be substituted with a hydroxy group, the aliphatic hydrocarbon group (e.g., an alkyl group, an alkenyl group) and the like. In the case of substitution with the halogen atom, since the halogen atom in $X^{21}$ is defined to be an atom selected from a chlorine atom, a bromine atom, and an iodine atom, and the halogen atom in $X^{22}$ to $X^{26}$ is defined to be an atom selected from a fluorine atom, a chlorine atom, a bromine atom, and an iodine atom, as the halogen atom substituting for the hydrocarbon of $X^{21}$, the same as those exemplified as the halogen atom of $X^{21}$ are preferably exemplified, and as the halogen atom substituting for the hydrocarbon of $X^{22}$ to $X^{26}$, the same as those exemplified as the halogen atom of $X^{22}$ to $X^{26}$ are preferably exemplified.

Among the organic halides 2 represented by the general formula (2), preferred is a compound in which each of $X^{21}$ to $X^{26}$ is a halogen atom or a monovalent halogenated hydrocarbon group in which at least one hydrogen atom is substituted with a halogen atom, and at least one of $X^{21}$ to $X^{26}$ is a halogenated hydrocarbon group. As already mentioned, the halogen atom is preferably a chlorine atom, a bromine atom, or an iodine atom, the monovalent aliphatic hydrocarbon group is preferably an alkyl group, the number of carbon atoms of the alkyl group is preferably 1 or more, and the upper limit is preferably 16 or less, more preferably 8 or less, further preferably 4 or less, still further preferably 2 or less.

When one of $X^{21}$ to $X^{26}$ is a halogenated hydrocarbon group, at least one of the others is preferably a halogen atom or a hydrogen atom. The number of halogen atoms or hydrogen atoms is more preferably 2 or more, further preferably 3 or more, still further preferably 4 or more, and particularly preferably 5. That is, when one of $X^{21}$ to $X^{26}$ is a halogenated hydrocarbon group, it is particularly preferable that the rest are all halogen atoms, or the rest are all hydrogen atoms.

When two or more of $X^{21}$ to $X^{26}$ are halogenated hydrocarbon groups, at least one preferably has two or more halogen atoms, more preferably has three, and at least one of the others preferably has one halogen atom. Further, others are hydrogen atoms or halogen atoms, and a hydrogen atom is preferred. It is more preferable that others are all hydrogen atoms. Such a compound is also advantageous in terms of easy availability.

Organic Halide 3

The organic halide 3 is a compound represented by the following general formula (3).

(3)

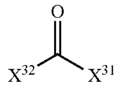

(3a)

$$—R^{31}—OR^{32}$$

In the general formula (3), each of $X^{31}$ and $X^{32}$ is independently a hydrogen atom, a halogen atom, a monovalent aliphatic hydrocarbon group, a monovalent alicyclic hydrocarbon group or a group represented by the general formula (3a). In the general formula (3a), $R^{31}$ is a single bond or a divalent aliphatic hydrocarbon group, and $R^{32}$ is a hydrogen atom, a halogen atom or a monovalent aliphatic hydrocarbon group. A hydrogen atom in the monovalent aliphatic hydrocarbon group, and the monovalent alicyclic hydrocarbon group may be substituted with a halogen atom, and at least one of $X^{31}$ and $X^{32}$ is a halogen atom or a group containing a halogen atom. Further, the halogen atom for $X^{31}$ is an atom selected from a chlorine atom, a bromine atom, and an iodine atom, and the halogen atom for $X^{32}$ is an atom selected from a fluorine, a chlorine atom, a bromine atom, and an iodine atom.

As the halogen atom in $X^{31}$, those described as the halogen atom of $X^{11}$ are preferably exemplified, and as the halogen atom in $X^{32}$, the same as those described as the halogen atom of $X^{12}$ to $X^{14}$ are preferably exemplified. As for the halogen atom of $X^{32}$, a fluorine atom, a chlorine atom, and a bromine atom are more preferable, and the chlorine atom is further preferable. When $X^{31}$ and $X^{32}$ are halogen atoms, the halogen atoms may be the same or different.

As already mentioned, when the organic halide 3 is used, it is thought that the adhesion or reaction to/with the sulfide solid electrolyte is mainly caused by $X^{31}$. Further, when the halogen atom in $X^{32}$ is other than a fluorine atom, it is thought that this may be caused by $X^{32}$ in some cases. Further, the fact that this may be caused by $X^{32}$ in some cases is also similarly applied to a case to be described below in which the hydrocarbon group is substituted with the halogen atom. Further, when $X^{31}$ is a hydrocarbon group such as an aliphatic hydrocarbon group, or an alicyclic hydrocarbon group, which will be described below, it is thought that the adhesion is caused by the hydrocarbon group of $X^{31}$. Further, when $X^{32}$ is a hydrocarbon group, it is thought that this may be caused by $X^{32}$ in some cases.

As for the monovalent aliphatic hydrocarbon group and the alicyclic hydrocarbon group of $X^{31}$ and $X^{32}$, the same as the monovalent aliphatic hydrocarbon groups, and the alicyclic hydrocarbon groups for $X^{12}$ to $X^{14}$ are preferably exemplified, and the aliphatic hydrocarbon group is preferable.

The monovalent aliphatic hydrocarbon group is preferably an alkyl group, or an alkenyl group, and the alkyl group is more preferable. In the case of the alkyl group, the number of carbon atoms is preferably 1 or more, more preferably 2 or more, further preferably 4 or more, and the upper limit is preferably 24 or less, more preferably 16 or less, further preferably 12 or less, still further preferably 10 or less. In the case of the alkenyl group, it is preferably 2 or more, more preferably 4 or more, and the upper limit is the same as in the alkyl group. Further, these may be linear or branched like the monovalent aliphatic hydrocarbon group, and the monovalent alicyclic hydrocarbon group of $X^{12}$ to $X^{14}$. Further, when $X^{31}$ and $X^{32}$ are aliphatic hydrocarbon groups, or alicyclic hydrocarbon groups, the aliphatic hydrocarbon groups, or the alicyclic hydrocarbon groups may be the same or different. At least one of the aliphatic hydrocarbon groups or the alicyclic hydrocarbon groups is a group in which the hydrogen atom is substituted with a halogen atom.

The monovalent aliphatic hydrocarbon group of $X^{31}$ and $X^{32}$ may have a hydrogen atom substituted with a halogen atom, or may be substituted with a hydroxy group and the like. The alicyclic hydrocarbon group may have a hydrogen atom substituted with a halogen atom, or may be substituted with a hydroxy group, the aliphatic hydrocarbon group (e.g., an alkyl group, an alkenyl group) and the like. In the case of substitution with the halogen atom, since the halogen atom in $X^{31}$ is defined to be an atom selected from a chlorine atom, a bromine atom, and an iodine atom, and the halogen atom in $X^{32}$ is defined to be an atom selected from a fluorine atom, a chlorine atom, a bromine atom, and an iodine atom, as the halogen atom substituting for the hydrocarbon of $X^{31}$, the same as those exemplified as the halogen atom of $X^{31}$ are exemplified, and as the halogen atom substituting for the hydrocarbon of $X^{32}$, the same as those exemplified as the halogen atom of $X^{32}$ are preferably exemplified.

Examples of the divalent aliphatic hydrocarbon group of $R^{31}$ in the general formula (3a) include those obtained by removing one hydrogen atom from the monovalent aliphatic hydrocarbon group of $X^{31}$ and $X^{32}$. Therefore, the divalent aliphatic hydrocarbon group is preferably an alkylene group, or an alkenylene group, and is more preferably an alkylene group.

The number of carbon atoms of the divalent aliphatic hydrocarbon group is preferably 1 or more, and the upper limit is preferably 8 or less, more preferably 6 or less, further preferably 4 or less.

As for the monovalent aliphatic hydrocarbon group of $R^{32}$ in the general formula (3a), the same as those for the monovalent aliphatic hydrocarbon group of $X^{31}$ and $X^{32}$ can be preferably exemplified.

As for the aliphatic hydrocarbon group, an alkyl group, and an alkenyl group are preferable, and an alkyl group is more preferable. The aliphatic hydrocarbon group may be linear or branched, but is preferably branched. Further, when the aliphatic hydrocarbon group is an alkyl group, the number of carbon atoms is preferably 1 or more, more preferably 2 or more, further preferably 4 or more, and the upper limit is preferably 24 or less, more preferably 16 or less, further preferably 12 or less, still further preferably 10 or less.

The hydrocarbon group for $R^{31}$ and $R^{32}$ may be substituted with a halogen atom like the hydrocarbon group for $X^{31}$ and $X^{32}$. In this case, the halogen atom is determined according to which of $X^{31}$ and $X^{32}$ is the general formula (3a). When $X^{31}$ is the general formula (3a), the halogen atom is selected from those corresponding to the halogen atom for $X^{31}$, that is, a chlorine atom, a bromine atom, and an iodine atom, and when $X^{32}$ is the general formula (3a), the halogen atom is selected from those corresponding to the halogen atom for $X^{32}$, that is, a fluorine atom, a chlorine atom, a bromine atom, and an iodine atom.

Among the organic halides 3 represented by the general formula (3), preferred is a compound in which $X^{31}$ is a halogen atom, and $X^{32}$ is a monovalent aliphatic hydrocarbon group having 2 or more carbon atoms or a group represented by the general formula (3a). Here, as for the halogen atom for $X^{31}$, a chlorine atom, and a bromine atom are preferable, and a chlorine atom is more preferable. The monovalent aliphatic hydrocarbon group for $X^{32}$ is preferably an alkyl group. The number of carbon atoms is more preferably 4 or more, and the upper limit is preferably 12 or less, more preferably 10 or less.

Further, in the general formula (3a), as for $R^{31}$, a single bond, and a divalent aliphatic hydrocarbon group are preferable, and a single bond is more preferable. Further, as for $R^{32}$, a monovalent aliphatic hydrocarbon group is preferable, an alkyl group, and an alkenyl group are more preferable, and an alkyl group is further preferable.

Organic Halide 4

The organic halide 4 is a compound represented by the following general formula (4).

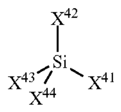

(4)

In the general formula (4), each of $X^{41}$ to $X^{44}$ is independently a hydrogen atom, a halogen atom, a monovalent aliphatic hydrocarbon group or a monovalent alicyclic hydrocarbon group, and a hydrogen atom in the monovalent aliphatic hydrocarbon group, and the monovalent alicyclic hydrocarbon group may be substituted with a halogen atom. At least one of $X^{41}$ to $X^{44}$ is a halogen atom or a group containing a halogen atom. Further, the halogen atom for $X^{41}$ is an atom selected from a chlorine atom, a bromine atom, and an iodine atom, and the halogen atom for $X^{42}$ to $X^{44}$ is an atom selected from a fluorine atom, a chlorine atom, a bromine atom, and an iodine atom.

As for the halogen atom for $X^{41}$, those described as the halogen atom for $X^{11}$ are preferably exemplified, and as for the halogen atom for $X^{42}$ to $X^{44}$, the same as those described as the halogen atom of $X^{12}$ to $X^{14}$ are preferably exemplified. As for the halogen atom for $X^{41}$, a chlorine atom and a bromine atom are preferable, and a chlorine atom is more preferable. The same also applies to preferable halogen atoms for $X^{42}$ to $X^{44}$. When two or more of $X^{41}$ to $X^{44}$ are halogen atoms, the halogen atoms may be the same or different.

As already mentioned, when the organic halide 4 is used, it is thought that the adhesion or reaction to/with the sulfide solid electrolyte is mainly caused by $X^{41}$. Further, when the halogen atom in $X^{42}$ to $X^{44}$ is other than a fluorine atom, it is thought that this may be caused by $X^{42}$ to $X^{44}$ in some cases. Further, the fact that this may be caused by $X^{42}$ to $X^{44}$ in some cases is also similarly applied to a case to be described below in which the hydrocarbon group is substituted with the halogen atom. Further, when $X^{41}$ is a hydrocarbon group such as an aliphatic hydrocarbon group or an alicyclic hydrocarbon group, which will be described below, it is thought that the adhesion is caused by the hydrocarbon group for $X^{41}$.

Further, when $X^{42}$ to $X^{44}$ are hydrocarbon groups, it is thought that this may be caused by $X^{42}$ to $X^{44}$ in some cases.

As for the monovalent aliphatic hydrocarbon group and the alicyclic hydrocarbon group for $X^{41}$ to $X^{44}$, the same as the monovalent aliphatic hydrocarbon groups and the alicyclic hydrocarbon groups for $X^{12}$ to $X^{14}$ are preferably exemplified, and the aliphatic hydrocarbon group is preferable.

As for the monovalent aliphatic hydrocarbon group, an alkyl group, and an alkenyl group are preferable, and an alkyl group is more preferable. In the case of the alkyl group, the number of carbon atoms is preferably 1 or more, and the upper limit is preferably 24 or less, more preferably 12 or less, further preferably 8 or less, still further preferably 4 or less, particularly preferably 2 or less. In the case of the alkenyl group, the number of carbon atoms is preferably 2 or more, and the upper limit is the same as in the alkyl group. Further, these may be linear or branched like the monovalent aliphatic hydrocarbon group and the monovalent alicyclic hydrocarbon group for $X_{12}$ to $X_{14}$. Further, when $X^{41}$ to $X^{44}$ are aliphatic hydrocarbon groups, or alicyclic hydrocarbon groups, the aliphatic hydrocarbon groups, or the alicyclic hydrocarbon groups may be the same or different.

The monovalent aliphatic hydrocarbon group for $X^{41}$ to $X^{44}$ may have a hydrogen atom substituted with a halogen atom, or may be substituted with a hydroxy group and the like. The alicyclic hydrocarbon group may have a hydrogen atom substituted with a halogen atom, or may be substituted with a hydroxy group, the aliphatic hydrocarbon group (e.g., an alkyl group, an alkenyl group) and the like. In the case of substitution with the halogen atom, since the halogen atom in $X^{41}$ is defined to be an atom selected from a chlorine atom, a bromine atom, and an iodine atom, and the halogen atom in $X^{42}$ to $X^{44}$ is defined to be an atom selected from a fluorine atom, a chlorine atom, a bromine atom, and an iodine atom, as for the halogen atom substituting for the hydrocarbon of $X^{41}$, the same as those exemplified as the halogen atom of $X^{41}$ are exemplified, and as for the halogen atom substituting for the hydrocarbon of $X^{42}$ to $X^{44}$, the same as those exemplified as the halogen atom of $X^{42}$ to $X^{44}$ are preferably exemplified.

Among the organic halides 4 represented by the general formula (4), preferred is a compound in which $X^{41}$ is a halogen atom, and $X^{42}$ to $X^{44}$ are monovalent aliphatic hydrocarbon groups. Here, as for the halogen atom, a fluorine atom, a chlorine atom, and a bromine atom are preferable, and a chlorine atom is more preferable. As for the monovalent aliphatic hydrocarbon group for $X^{42}$ to $X^{44}$, an alkyl group is preferable, the number of carbon atoms is preferably 1 or more, and the upper limit is preferably 8 or less, more preferably 4 or less, further preferably 2 or less.

Usage Amount of Organic Halide

As already mentioned, the usage amount of the organic halide in the manufacturing method of the present embodiment is preferably 0.05 parts by mole or more and 3.5 parts by mole or less with respect to 100 parts by mole of sulfur atoms contained in the sulfide solid electrolyte. From the viewpoint of more efficiently reducing oil absorption, and improving coating suitability, the usage amount of the organic halide 2 is more preferably 0.1 parts by mole or more with respect to 100 parts by mole of sulfur atoms contained in the sulfide solid electrolyte, further preferably 0.75 parts by mole or more, still further preferably 1.0 parts by mole or more, particularly preferably 1.5 parts by mole or more, and the upper limit is more preferably 3.3 parts by mole or less, further preferably 3.0 parts by mole or less, still further preferably 2.5 parts by mole or less.

Further, from the viewpoint similar to this, when the organic halides 1, 3 and 4 are used, it is more preferably 0.1 parts by mole or more with respect to 100 parts by mole of sulfur atoms contained in the sulfide solid electrolyte, further preferably 0.5 parts by mole or more, still further preferably 0.75 parts by mole or more, and the upper limit is more preferably 3.0 parts by mole or less, further preferably 2.5 parts by mole or less, still further preferably 2.0 parts by mole or less, particularly preferably 1.5 parts by mole or less.

Organic Solvent

As for the organic solvent to be used in the manufacturing method of the present embodiment, for example, solvents described as those usable in the method of manufacturing the sulfide solid electrolyte may be preferably exemplified.

From the viewpoint of promoting the mixing of the sulfide solid electrolyte and the organic halide, and allowing the organic halide, or a hydrocarbon group derived from the organic halide to easily adhere to or react with the surface of the sulfide solid electrolyte, among the solvents, preferred are aliphatic hydrocarbon solvents, alicyclic hydrocarbon solvents, aromatic hydrocarbon solvents, and ether solvents, ester solvents, and nitrile solvents exemplified as complexing agents, and more preferred are aromatic hydrocarbon solvents. As for the aromatic hydrocarbon solvent, toluene is particularly preferable.

As for the organic solvent, these may be used alone, or may be used in combination of two or more types.

Mixing

In the manufacturing method of the present embodiment, a method of mixing the sulfide solid electrolyte, the organic halide, and the organic solvent can be performed in the same manner as in the "mixing" in the method of manufacturing the sulfide solid electrolyte.

Removal

The removal of the organic solvent can be performed in the same manner as in the "drying" in the method of manufacturing the sulfide solid electrolyte.

Further, in the manufacturing method of the present embodiment, "heating" in the above method of manufacturing the sulfide solid electrolyte may be performed.

Modified Sulfide Solid Electrolyte

The modified sulfide solid electrolyte of the present embodiment is obtained by the modified sulfide solid electrolyte manufacturing method of the present embodiment, and has an organic halide or a compound containing a hydrocarbon group derived from the organic halide.

Further, the modified sulfide solid electrolyte of the present embodiment is obtained by the modified sulfide solid electrolyte manufacturing method of the present embodiment, and has a lithium halide formed by a halogen atom derived from the organic halide, and a lithium atom derived from the sulfide solid electrolyte.

The modified sulfide solid electrolyte of the present embodiment is obtained by the modified sulfide solid electrolyte manufacturing method of the present embodiment, in which as already mentioned, the sulfide solid electrolyte and the organic halide are mixed, so that the organic halide, or a hydrocarbon group derived from the organic halide adheres to the sulfide solid electrolyte. Then, even the sulfide solid electrolyte having a large specific surface area of 10 $m^2/g$ or more is excellent in coating suitability when applied as a paste. That is, the modified sulfide solid electrolyte of the present embodiment has a compound containing a hydrocarbon group, which is formed by adhesion of the organic halide, or the hydrocarbon group derived from the organic halide, to the sulfide solid electrolyte.

Further, in the modified sulfide solid electrolyte of the present embodiment, the organic halide is attached to the surface of the sulfide solid electrolyte, and due to the adhesion of the organic halide, the oil absorption is reduced and then an excellent coating suitability is obtained. What mode causes the adhesion of the organic halide is unknown, but due to the adhesion, a halogen atom derived from the organic halide and a lithium atom derived from the sulfide solid electrolyte are bonded to form a lithium halide. The fact that the modified sulfide solid electrolyte of the present embodiment has the lithium halide means that through the manufacturing method of the present embodiment, the organic halide adheres to the surface of the sulfide solid electrolyte, and then due to the adhesion, the oil absorption is reduced, and an excellent coating suitability is obtained, that is, the sulfide solid electrolyte is modified and the modified sulfide solid electrolyte is obtained.

Lithium Halide

The lithium halide contained in the modified sulfide solid electrolyte of the present embodiment is formed by a halogen atom derived from the organic halide, and a lithium atom derived from the sulfide solid electrolyte. Further, as already mentioned, in the modified sulfide solid electrolyte of the present embodiment, since the organic halide is attached to the surface of the sulfide solid electrolyte, it can be said that the lithium halide is a by-product produced when the organic halide is attached to the surface of the sulfide solid electrolyte.

As already mentioned, since as for the halogen atom derived from the organic halide, a chlorine atom, a bromine atom, and an iodine atom may be exemplified, as for the lithium halide, a lithium chloride, a lithium bromide, and a lithium iodide may be exemplified.

Regarding the modified sulfide solid electrolyte of the present embodiment, the fact that the organic halide is attached to the surface of the sulfide solid electrolyte, thereby producing a lithium halide as a by-product, can be confirmed by powder X-ray diffraction (XRD) measurement on the modified sulfide solid electrolyte.

When only the sulfide solid electrolyte is subjected to XRD measurement, a halo peak is mainly observed in an amorphous sulfide solid electrolyte, and a solid electrolyte-derived peak is mainly observed in a crystalline sulfide-based solid electrolyte, as already mentioned, although the amorphous sulfide solid electrolyte and the crystalline sulfide solid electrolyte are materials having no relation to presence/absence of a raw material-derived peak. However, when the modified sulfide solid electrolyte of the present embodiment is subjected to XRD measurement, a clear peak corresponding to the lithium halide is confirmed clearly unlike when only the sulfide solid electrolyte is subjected to the measurement.

For example, when the lithium halide is a lithium chloride, peaks derived from the lithium chloride are observed at $2\theta$=29.5 to 30.5°, 34.3 to 35.3°, 49.5 to 50.5° and 59.0 to 60.0°. When the lithium halide is a lithium bromide, peaks derived from the lithium bromide are observed at $2\theta$=27.5 to 28.5°, 32.3 to 33.3°, 46.0 to 47.5°, 54.8 to 56.2°, and 56.9 to 58.9°. Further, when the lithium halide is a lithium iodide, peaks derived from the lithium iodide are observed at 25.1 to 26.3°, 29.2 to 30.2°, 42.0 to 43.0°, 49.7 to 51.0°, and 52.0 to 53.4°.

Further, as illustrated in Examples to be described below, when a modified sulfide solid electrolyte obtained by mixing a sulfide solid electrolyte and an organic halide in an organic solvent is added to a solvent such as toluene and is made into a slurry, after this is allowed to stand still, in an analysis of the supernatant liquid through gas chromatography mass spectrometry (GC/MS method), the organic halide is not detected. Meanwhile, a chemical shift of a group (an alkyl group and the like) derived from the organic halide is detected when precipitated powder, from which the solvent is removed through drying, is dissolved in heavy methanol, and is subjected to $^{1}$H-NMR measurement.

From this phenomenon, in the modified sulfide solid electrolyte, it can be found that the organic halide is in such a form that it is desorbed as the organic halide on the surface of the sulfide solid electrolyte (for example, the original form of the organic halide), and a hydrocarbon group or the like included in the organic halide is strongly attached to the sulfide solid electrolyte. Then, it is thought that such adhesion reduces the amount of oil, resulting in excellent coating suitability.

The organic halide adhering to the surface of the sulfide solid electrolyte may adhere to a part of the surface of the sulfide solid electrolyte, or may adhere to the surface such that the entire surface is covered.

Properties of Modified Sulfide Solid Electrolyte

Even if the organic halide is attached to the surface of the modified sulfide solid electrolyte of the present embodiment, or the lithium halide is produced as a by-product, the BET specific surface area of the sulfide solid electrolyte is not greatly affected. Then, the BET specific surface area of the sulfide solid electrolyte used in the present embodiment and the BET specific surface area of the modified sulfide solid electrolyte are substantially the same. Therefore, the modified sulfide solid electrolyte of the present embodiment has a BET specific surface area of 10 $m^2/g$ or more, that is, a large specific surface area. From the viewpoint that the larger the BET specific surface area of the sulfide solid electrolyte, the further the superiority of the effect can be exhibited, the BET specific surface area is preferably 12 $m^2/g$ or more, more preferably 15 $m^2/g$ or more, further preferably 20 $m^2/g$ or more. From the similar viewpoint, the upper limit is not particularly limited, but is practically 100 $m^2/g$ or less, preferably 75 $m^2/g$ or less, more preferably 50 $m^2/g$ or less.

Although the BET specific surface area is large as described above, due to the effect of the organic halide attached to the surface, oil absorption of the modified sulfide solid electrolyte of the present embodiment is small and is usually less than 0.9 mL/g, and furthermore is 0.85 mL/g or less, or less than 0.80 mL/g. The modified sulfide solid electrolyte of the present embodiment has a large BET specific surface area, but has small oil absorption. Thus, when it is formed into a paste, the viscosity increase of the paste can be suppressed, and the coating suitability is improved during coating. Further, since the viscosity increase of the paste is suppressed, there is no need to use a solvent and the like and then excellent battery performance is easily obtained.

In the present specification, regarding the oil absorption, 1 g of the modified sulfide solid electrolyte was taken as a sample, and then an operation of adding one drop of butyl butyrate and stirring with a spatula was performed in a mortar or the like. The operation was repeated until the sample became a paste, and the total amount of the added butyl butyrate was determined as oil absorption (mL/g). Here, the "paste" means a state of "to the extent that it can be spread without cracking or crumbling, and can lightly adhere to a measurement plate", which is defined in "7.2 measurement" of JIS K5101-13-1:2004 (Pigment test method-Part 13: oil absorption-Section 1: refined linseed oil method).

Further, the ionic conductivity of the modified sulfide solid electrolyte of the present embodiment is usually 0.5 mS/cm or more, and furthermore is 1.0 mS/cm or more, 1.5 mS/cm or more, 2.0 mS/cm or more, or 2.5 mS/cm or more. Since an extremely high ionic conductivity is included, a lithium battery having an excellent battery performance is obtained.

Use

The modified sulfide solid electrolyte of the present embodiment is excellent in coating suitability, and can be provided for battery production without using a solvent or the like. Thus, it is possible to efficiently exhibit an excellent battery performance. Further, it has a high ionic conductivity, and has an excellent battery performance, and thus is suitably used for batteries.

The modified sulfide solid electrolyte of the present embodiment may be used for a positive electrode layer, may be used for a negative electrode layer, or may be used for an electrolyte layer. Each layer can be produced by a conventionally known method.

Further, in addition to the positive electrode layer, the electrolyte layer and the negative electrode layer, a current collector is preferably used for the battery, and as for the current collector, those that have been conventionally known can be used. For example, it is possible to use a layer of Au, Pt, Al, Ti, Cu or the like reacting with the solid electrolyte, which is covered with Au and the like.

Electrode Combined Material

The electrode combined material of the present embodiment is an electrode combined material including the modified sulfide solid electrolyte of the present embodiment, and an electrode active material.

Electrode Active Material

As for the electrode active material, each of a positive electrode active material, and a negative electrode active material is employed depending on whether the electrode combined material is used for a positive electrode, or a negative electrode.

As for the positive electrode active material, any material can be used without any particular limitation as long as it can promote a battery chemical reaction involving the lithium ion movement caused by an atom employed as an atom exhibiting ionic conductivity, preferably a lithium atom, in relation to the negative electrode active material. Examples of this positive electrode active material capable of inserting/releasing lithium ions include oxide-based positive electrode active materials and sulfide-based positive electrode active materials.

Preferable examples of the oxide-based positive electrode active material include lithium-containing transition metal composite oxides such as LMO (lithium manganese oxide), LCO (lithium cobalt oxide), NMC (lithium nickel manganese cobalt oxide), NCA (lithium nickel cobalt aluminum oxide), LNCO (lithium cobalt nickel oxide), and an olivine-type compound ($LiMeNPO_4$, Me=Fe, Co, Ni, Mn).

Examples of the sulfide-based positive electrode active material include titanium sulfide ($TiS_2$), molybdenum sulfide ($MoS_2$), iron sulfide (FeS, $FeS_2$), copper sulfide (CuS), and nickel sulfide ($Ni_3S_2$).

Further, besides the positive electrode active materials, niobium selenide ($NbSe_3$) or the like can also be used.

The positive electrode active materials may be used alone, or in combination of two or more types.

As for the negative electrode active material, it is possible to use any material, e.g., a metal capable of forming an alloy with an atom employed as an atom exhibiting ionic conductivity (preferably, a lithium atom), an oxide thereof, and an alloy of the metal and the lithium atom, without any particular limitation, as long as it is possible to promote a battery chemical reaction involving the lithium ion movement preferably caused by the lithium atom. As this negative electrode active material capable of inserting/releasing lithium ions, those that have been conventionally known as a negative electrode active material in the field of batteries can be employed without any limitation.

Examples of such a negative electrode active material include metallic lithium or metals capable of forming alloys with metallic lithium, such as metallic lithium, metallic indium, metallic aluminum, metallic silicon, and metallic tin, oxides of these metals, and alloys of these metals and metallic lithium.

The electrode active material used in the present embodiment may have a coated surface, that is, a coating layer.

Examples of the material for forming the coating layer include ion conductors, such as nitrides and oxides of an atom exhibiting ionic conductivity in the sulfide solid electrolyte (preferably, a lithium atom), or composites thereof. Specific examples thereof include: lithium nitride ($Li_3N$); a conductor having a LISICON-type crystal structure such as, for example, $Li_{4-2x}Zn_xGeO_4$ in which the main structure is $Li_4GeO_4$; a conductor having a THIO-LISICON-type crystal structure such as, for example, $Li_{4-x}Ge_{1-x}P_xS_4$, which has a $Li_3PO_4$-type skeleton structure; a conductor having a perovskite-type crystal structure such as $La_{2/3-}xLi_{3x}TiO_3$; and a conductor having a NASICON-type crystal structure such as $LiTi_2(PO_4)_3$.

Further, lithium titanates such as $Li_yTi_{3-y}O_4$($0<y<3$) and $Li_4Ti_5O_{12}$(LTO), lithium metal oxides of metals belonging to Group 5 of the periodic table, such as $LiNbO_3$, and $LiTaO_3$, and oxide-based conductors such as $Li_2O—B_2O_3—P_2O_5$-based, $Li_2O—B_2O_3$—ZnO-based, and $Li_2O—Al_2O_3—SiO_2—P_2O_5—TiO_2$-based conductors may be exemplified.

The electrode active material having the coating layer is obtained by, for example, attaching a solution containing various atoms that make up the coating layer-forming material to the surface of the electrode active material, and firing the electrode active material preferably at 200° C. or more and 400° C. or less after the attachment.

Here, as for the solution containing various atoms, for example, solutions containing alkoxides of various metals such as lithium ethoxide, titanium isopropoxide, niobium isopropoxide, and tantalum isopropoxide may be used. In this case, as for a solvent, alcohol-based solvents such as ethanol, and butanol; aliphatic hydrocarbon solvents such as hexane, heptane, and octane; and aromatic hydrocarbon solvents such as benzene, toluene, and xylene may be used.

Further, the adhesion may be performed by immersion, spray coating, or the like.

The firing temperature is preferably 200° C. or more and 400° C. or less, more preferably 250° C. or more and 390° C. or less from the viewpoint of production efficiency and battery performance improvement, and the firing time is usually about 1 minute to 10 hours, preferably 10 minutes to 4 hours.

The coverage rate of the coating layer is preferably 90% or more with respect to the surface area of the electrode active material, more preferably 95% or more, further preferably 100%. That is, it is preferable that the entire surface is covered. Further, the thickness of the coating layer is preferably 1 nm or more, more preferably 2 nm or more, and the upper limit is preferably 30 nm or less, more preferably 25 nm or less.

The thickness of the coating layer can be measured through cross-sectional observation on the thickness of the coating layer with a transmission electron microscope (TEM), and the coverage rate can be calculated from the thickness of the coating layer, the element analysis value, and the BET specific surface area.

Other Components

The electrode combined material of the present embodiment may contain other components such as for example a conductive material, and a binder, in addition to the modified sulfide solid electrolyte, and the electrode active material. That is, in the manufacturing method of the electrode combined material of the present embodiment, other components such as, for example, a conductive material, and a binder may be used in addition to the modified sulfide solid electrolyte, and the electrode active material. In mixing the modified sulfide solid electrolyte and the electrode active material, other components such as a conductive agent, and a binder may be used by being added and mixed to/with the modified sulfide solid electrolyte and the electrode active material.

Examples of the conductive material include carbon-based materials such as artificial graphite, graphite carbon fiber, resin calcined carbon, pyrolytic vapor-grown carbon, coke, mesocarbon microbeads, furfuryl alcohol resin calcined carbon, polyacene, pitch-based carbon fiber, vapor grown carbon fiber, natural graphite, and non-graphitizable carbon from the viewpoint of improving electronic conductivity, thereby improving battery performance.

By using the binder, the strength in a case where a positive electrode and a negative electrode are produced is improved.

The binder is not particularly limited as long as it can impart functions such as binding properties, flexibility and the like, and examples thereof include: fluorine-based polymers such as polytetrafluoroethylene, and polyvinylidene fluoride; thermoplastic elastomers such as butylene rubber, and styrene-butadiene rubber; and various resins such as acryl resin, acrylpolyol resin, polyvinylacetal resin, polyvinylbutyral resin, and silicon resin.

In the electrode combined material, the blending ratio (mass ratio) of the electrode active material and the modified sulfide solid electrolyte is preferably 99.5:0.5 to 40:60, more preferably 99:1 to 50:50, further preferably 98:2 to 60:40 in terms of battery performance improvement, and production efficiency.

When the conductive material is contained, the content of the conductive material in the electrode combined material is not particularly limited, but is preferably 0.5% by mass or more, more preferably 1% by mass or more, further preferably 1.5% by mass or more in terms of battery performance improvement, and production efficiency. The upper limit is preferably 10% by mass or less, preferably 8% by mass or less, further preferably 5% by mass or less.

Further, when the binder is contained, the content of the binder in the electrode combined material is not particularly limited, but is preferably 1% by mass or more, more preferably 3% by mass or more, further preferably 5% by mass or more in terms of battery performance improvement, and production efficiency. The upper limit is preferably 20% by mass or less, preferably 15% by mass or less, further preferably 10% by mass or less.

Lithium Ion Battery

The lithium ion battery of the present embodiment is a lithium ion battery including at least one selected from the modified sulfide solid electrolyte of the present embodiment and the electrode combined material.

The lithium ion battery of the present embodiment is not particularly limited in its configuration as long as it contains either the modified sulfide solid electrolyte of the present embodiment, or the electrode combined material containing the same. It only has to have a configuration of widely used lithium ion batteries.

The lithium ion battery of the present embodiment preferably includes, for example, a positive electrode layer, a negative electrode layer, an electrolyte layer, and a current collector. The electrode combined material of the present embodiment is preferably used for the positive electrode layer and the negative electrode layer, and the modified sulfide solid electrolyte of the present embodiment is preferably used for the electrolyte layer.

Further, as for the current collector, those that have been conventionally known may be used. For example, it is possible to use a layer of Au, Pt, Al, Ti, Cu or the like reacting with the solid electrolyte, which is covered with Au and the like.

EXAMPLE

Next, the present invention will be specifically described with reference to Examples, but the present invention is not limited by these examples at all.

Production Example 1: Production of Sulfide Solid Electrolyte 1

Into a stirring bar-equipped Schlenk flask (capacity: 100 mL), 0.59 g of lithium sulfide, 0.95 g of diphosphorus pentasulfide, 0.19 g of lithium bromide, and 0.28 g of lithium iodide were introduced under a nitrogen atmosphere. After the stirring bar was rotated, 20 mL of tetramethylethylene diamine (TMEDA) as a complexing agent was added, and then the stirring was continued for 12 h. The resultant complex-containing material was dried in a vacuum (room temperature: 23° C.) so that a powdery complex was obtained. Next, the complex powder was heated in a vacuum at 120° C. for 2 h to obtain an amorphous sulfide solid electrolyte. Further, the amorphous sulfide solid electrolyte was heated in a vacuum at 140° C. for 2 h to obtain a crystalline sulfide solid electrolyte 1 (the heating temperature for obtaining the crystalline sulfide solid electrolyte (140° C. in this Example) may be referred to as a "crystallization temperature" in some cases).

BET specific surface areas of the obtained amorphous sulfide solid electrolyte, and the crystalline sulfide solid electrolyte were measured, and both results were 40 $m^2/g$.

Production Example 2: Production of Sulfide Solid Electrolyte 2

Into an agitation blade-equipped reaction tank (capacity: 500 mL), 30.0 g of powder of the sulfide solid electrolyte obtained in Production Example 1, and 470 g of toluene were introduced under a nitrogen atmosphere. After the agitation blade was rotated, a pulverization treatment was performed for 30 min by using a bead mill for microbeads which can be operated in circulation ("UAM-015 (model number)", manufactured by HIROSHIMA METAL & MACHINERY CO., LTD.), under a predetermined condition (beads material: zirconia, beads diameter: 0.1 mmφ, beads usage amount: 391 g, pump flow rate 150 mL/min, peripheral speed 8 m/s, mill jacket temperature 20° C.). The obtained slurry was dried in a vacuum (room temperature: 23° C.) so as to obtain white powder of the amorphous solid electrolyte. This white powder was crystallized at 160° C. for 2 h so as to obtain a crystalline sulfide solid electrolyte 2. When the BET specific surface area of the obtained crystalline sulfide solid electrolyte 2 was measured, the result was 10 $m^2/g$.

Production Example 3: Production of Sulfide Solid Electrolyte 3

Into an agitation blade-equipped reaction tank (capacity: 500 mL), 30.0 g of powder of the sulfide solid electrolyte obtained in Production Example 1, and 470 g of toluene were introduced under a nitrogen atmosphere. After the agitation blade was rotated, a first pulverization treatment was performed for 30 min by using a bead mill for microbeads which can be operated in circulation ("UAM-015 (model number)", manufactured by HIROSHIMA METAL & MACHINERY CO., LTD.) under a predetermined condition (beads material: zirconia, beads diameter: 0.05 mmφ, beads usage amount: 391 g, pump flow rate 150 mL/min, peripheral speed 8 m/s, mill jacket temperature 20° C.). Then, the peripheral speed was changed to 12.5 m/s and a second pulverization treatment was performed for 10 min. The obtained slurry was dried in a vacuum (room temperature: 23° C.) so as to obtain white powder of the amorphous solid electrolyte. This white powder was crystallized at 160° C. for 2 h so as to obtain a crystalline sulfide solid electrolyte 3. When the BET specific surface area of the obtained crystalline sulfide solid electrolyte 3 was measured, the result was 8 $m^2/g$.

Example 1

3 g of the crystalline sulfide solid electrolyte 1 obtained in Production Example 1 was weighed and then was added to a stirring bar-equipped Schlenk (capacity: 100 mL), under a nitrogen atmosphere, and then 30 mL of toluene was added and stirring was performed so as to obtain a slurry-like fluid. To the slurry-like fluid, butyl iodide as an organic halide was further added in such an amount that its ratio accounts for 1 mol, with respect to 100 mol of sulfur atoms contained in the crystalline sulfide solid electrolyte (specifically, 0.58 mL). After stirring for 10 min, toluene was distilled off by vacuum drying so as to obtain a modified sulfide solid electrolyte.

The obtained modified sulfide solid electrolyte was measured for oil absorption and ionic conductivity on the basis of the following method. Further, the reduction rate of oil absorption was calculated on the basis of the following method. Table 1 illustrates the measurement results and calculation results.

Examples 2 to 19

A modified sulfide solid electrolyte was produced in the same manner as in Example 1 except that those noted in Table 1 were used for the type of the crystalline sulfide solid electrolyte, and the type and usage amount of the organic halide of Example 1.

The obtained modified sulfide solid electrolyte was measured for oil absorption and ionic conductivity on the basis of the following method. Further, the reduction rate of the oil absorption was calculated on the basis of the following method. Table 1 illustrates the measurement results and the calculation results. Further, the modified sulfide solid electrolytes of Examples 6 and 8 were measured according to the following powder X-ray diffraction (XRD) measurement method. The results are illustrated in FIG. 1.

Comparative Examples 1 to 3

Each of the sulfide solid electrolytes 1 to 3 obtained in Production Examples 1 to 3 was measured for oil absorption and ionic conductivity on the basis of the following method. Further, on the basis of the following method, the oil absorption was measured, and then the reduction rate of the oil absorption was calculated. Table 1 illustrates the measurement results and the calculation results. The oil absorption amounts of the sulfide solid electrolytes 1 and 2 were 0.98 (mL/g) and 0.93 mL/g, respectively.

Further, the sulfide solid electrolyte 1 of Comparative Example 1 was measured according to the following powder X-ray diffraction (XRD) measurement method. The result is illustrated in FIG. 1.

Measurement of Oil Absorption

To 1 g of the solid electrolyte sample obtained in each of Examples and Comparative Examples, one drop of butyl butyrate was added using a dropper, and then an operation of stirring with a spatula was performed in an agate mortar. The operation was repeated until the sample became a paste, and the total amount of the added butyl butyrate was determined as oil absorption (mL/g). The measured oil absorption was evaluated by the following criteria.

A. less than 0.8 mL/g

B. 0.8 mL/g or more and less than 0.9 mL/g

C. 0.9 mL/g or more

Reduction Rate of Oil Absorption

The oil absorption of the sulfide solid electrolytes 1 to 3 obtained in Production Examples 1 to 3 was measured in the same manner as described in the above (measurement of oil absorption). A numerical value was calculated according to the following equation by using oil absorption A of each of the sulfide solid electrolytes 1 to 3, and oil absorption B of each of the sulfide solid electrolytes obtained in Examples and Comparative Examples in the above (measurement of oil absorption), and was determined as the reduction rate of oil absorption. Here, as the oil absorption A, the oil absorption of any of the sulfide solid electrolytes 1 to 3 used in Examples and Comparative Examples is used. For example, for the oil absorption reduction rate of Example 1, the reduction rate is calculated by using the oil absorption of the sulfide solid electrolyte 1 as the oil absorption A, and the oil absorption of the modified sulfide solid electrolyte of Example 1, as the oil absorption B.

$$\textit{oil}\text{ absorption reduction rate}=(\textit{oil}\text{ absorption }A-\textit{oil}\text{ absorption }B)/\textit{oil}\text{ absorption }A\times 100(\%)$$

Measurement of Ionic Conductivity

In this Example, the ionic conductivity was measured as follows. From the sulfide solid electrolyte, a circular pellet with a diameter of 10 mm (cross-sectional area S: 0.785 $cm^2$), and a height (L) of 0.1 to 0.3 cm was formed and was used as a sample. Electrode terminals were taken from the top and bottom of the sample, and were subjected to measurement at 25° C. through an AC impedance method (frequency range: 1 MHz to 100 Hz, amplitude: 10 mV) so that a Cole-Cole plot was obtained. Near the right end of an arc observed in the high frequency-side region, the ionic conductivity σ (S/cm) was calculated according to the following formula, by using a real part Z' (Ω) at a point where −Z" (Ω) was minimized, as the bulk resistance R (Ω) of the electrolyte.

$$R=\rho(L/S)$$

$$\sigma=1/\rho$$

The measured ionic conductivity was evaluated according to the following criteria.

A. 2.5 mS/cm or more

B. 0.5 mS/cm or more and less than 2.5 mS/cm

C. less than 0.5 mS/cm

TABLE 1

| | | Sulfide Solid Electrolyte | Specific Surface Area [$m^2$/g] | Organic Halide | Content [mol] | Oil Absorption | Oil Absorption Reduction Rate [%] | Ionic Conductivity | Ionic Conductivity [mS/cm] |
|---|---|---|---|---|---|---|---|---|---|
| Example | 1 | 1 | 40 | Butyl Iodide | 1 | B | 10 | A | 3.1 |
| | 2 | 1 | 40 | Octyl Iodide | 1 | B | 12 | A | 2.8 |
| | 3 | 1 | 40 | Dodecyl Iodide | 1 | B | 14 | A | 2.5 |
| | 4 | 1 | 40 | Dodecyl Iodide | 3 | B | 20 | B | 1.5 |
| | 5 | 1 | 40 | Benzyl Bromide | 0.1 | B | 10 | A | 3.3 |
| | 6 | 1 | 40 | Benzyl Bromide | 1 | A | 26 | A | 2.8 |
| | 7 | 1 | 40 | Benzyl Bromide | 2 | A | 33 | B | 2.3 |
| | 8 | 1 | 40 | Benzyl Bromide | 3 | A | 35 | B | 2.1 |
| | 9 | 1 | 40 | 4-(Trifluoromethyl)benzyl Bromide | 1 | A | 39 | A | 2.7 |
| | 10 | 1 | 40 | 4-(Trifluoromethyl)benzyl Bromide | 3 | A | 48 | B | 1.9 |
| | 11 | 1 | 40 | Pentafluorobenzyl Bromide | 1 | A | 30 | A | 2.7 |

TABLE 1-continued

| | | Sulfide Solid Electrolyte | Specific Surface Area [$m^2/g$] | Organic Halide | Content [mol] | Oil Absorption | Oil Absorption Reduction Rate [%] | Ionic Conductivity | Ionic Conductivity [mS/cm] |
|---|---|---|---|---|---|---|---|---|---|
| | 12 | 1 | 40 | Pentafluorobenzyl Bromide | 3 | A | 38 | B | 1.7 |
| | 13 | 1 | 40 | Hexanoyl Chloride | 1 | B | 18 | A | 2.6 |
| | 14 | 1 | 40 | Decanoyl Chloride | 1 | A | 28 | A | 2.5 |
| | 15 | 1 | 40 | Decanoyl Chloride | 3 | A | 38 | B | 1.0 |
| | 16 | 1 | 40 | 3,3-Dimethybutyryl Chloride | 1 | A | 25 | B | 2.0 |
| | 17 | 1 | 40 | 2-Ethylhexyl Chloroformate | 1 | A | 26 | B | 2.1 |
| | 18 | 1 | 40 | Trimethylsilyl Chloride | 1 | B | 20 | B | 1.8 |
| | 19 | 2 | 10 | Pentafluorobenzyl Bromide | 1 | A | 21 | A | 2.9 |
| Comparative | 1 | 1 | 40 | — | — | C | — | A | 3.3 |
| Example | 2 | 2 | 10 | — | — | C | — | A | 3.5 |
| | 3 | 3 | 8 | — | — | A | — | A | 3.7 |

In Examples, the modified sulfide solid electrolyte of the present embodiment has an evaluation of A or B as an oil absorption evaluation. Thus, it was confirmed that in spite of a large specific surface area of 10 $m^2/g$ or more, the oil absorption is small, and the coating suitability is excellent. Further, it was confirmed that the ionic conductivity is also high (evaluation of A or B).

Meanwhile, the sulfide solid electrolytes of Comparative Examples 1 to 3, which were not mixed with organic halides and had surfaces to which the organic halides, or the like were not attached, are the sulfide solid electrolytes 1 to 3 produced in Production Examples 1 to 3, respectively. These are conventional sulfide solid electrolytes themselves. It was confirmed that the sulfide solid electrolytes 1 and 2 of Comparative Examples 1 and 2, which had specific surface areas of 10 $m^2/g$ or more, are evaluated as C in terms of oil absorption, and are inferior in the coating suitability. Further, since the sulfide solid electrolyte 3 of Comparative Example 3 has evaluations of A, as evaluations for both the oil absorption, and ionic conductivity, it was confirmed that there is little need for modification. That is, it was confirmed that the modified sulfide solid electrolyte manufacturing method of the present embodiment is suitable for those having large specific surface areas of 10 $m^2/g$ or more, because it is possible to exhibit an effect of reducing oil absorption, and improving the coating suitability.

Further, FIG. 1 illustrates the results when a powder X-ray diffraction (XRD) measurement was performed on the modified sulfide solid electrolytes of Examples 6 and 8, and the sulfide solid electrolyte 1 of Comparative Example 1. According to FIG. 1, it can be found that in the modified sulfide solid electrolytes of Examples 6 and 8, peaks of lithium bromide as lithium halide were detected (see arrow parts in FIG. 1), whereas in the sulfide solid electrolyte 1 of Comparative Example 1, no lithium bromide peak was detected. From these results, it is thought that the modified sulfide solid electrolyte has a lithium bromide formed by a bromine atom derived from the organic halide (benzyl bromide), and a lithium atom derived from the sulfide solid electrolyte, and the modified sulfide solid electrolyte is obtained through modification with the organic halide.

Example 21

Hereinafter, a verification was performed on the modified sulfide solid electrolyte obtained in Example in order to confirm whether the organic halide was attached to the surface.

First, the modified sulfide solid electrolyte obtained by using 1 part by mole of the organic halide (pentafluorobenzyl bromide) in Example 11 was added to toluene and was made into a slurry (slurry concentration: 12% by mass). Then, this was allowed to stand still for 12 h. A supernatant liquid produced by sedimentation of the sulfide solid electrolyte was collected, and was analyzed by gas chromatography mass spectrometry (GC/MS method). In the quantitation in this analysis, a preparation liquid (toluene solution of 1 part by mole of pentafluorobenzyl bromide) was also analyzed in the same manner as the supernatant liquid. In a case where the peak area of pentafluorobenzyl bromide in the preparation liquid was set as 1, a comparison was made to the peak area of the organic halide remaining in the supernatant liquid (a peak area of the supernatant liquid closer to 1 means that the organic halide was liberated from the sulfide solid electrolyte, and was dissolved in toluene). According to the analysis, since no organic halide was detected in the supernatant liquid, it is thought that when 1 part by mole of the organic halide was used, it was completely attached to the sulfide solid electrolyte.

Gas Chromatography Mass Spectrometry Conditions

Gas chromatography: 7890B (manufactured by Agient)
Analysis column: HP-1 ms (manufactured by Agilent)
GC oven temperature rise condition:
 Iinitial temperature 50° C.
 Temperature rise at 10° C./min from 50° C. to 300° C.
 Kept at 300° C. for 5 minutes
Sample injection volume: 1 μL Further, toluene was added to the precipitated sulfide solid electrolyte, followed by stirring. Then, this was allowed to stand still for 12 h and the supernatant was removed. This process was repeated three times so as to wash the precipitated sulfide solid electrolyte. After washing, the sulfide solid electrolyte obtained by drying toluene was dissolved in heavy methanol, and was subjected to $^1$H-NMR measurement by the following method. As a result, a chemical shift of a group (an alkyl group and the like) derived from the organic halide was detected.

$^1$H-NMR Measurement

Nuclear magnetic resonance device (NMR device):
 AVANCE III HD (manufactured by BEUKER)
observation nuclei: $^1$H
resonance frequency: 500 MHz probe: 5 mmφ TCI cryoprobe
measurement temperature: 25° C.
cumulative number: 16 times Example 22

Regarding the modified sulfide solid electrolyte obtained by using 3 parts by mole of the organic halide (pentafluorobenzyl bromide) in Example 11, measurement was performed on the supernatant liquid, and the precipitated solid electrolyte in the same manner as in Example 21. As a result, as in Example 21, no organic halide was detected in the supernatant liquid. The precipitated sulfide solid electrolyte was washed with toluene, and then was subjected to $^{1}H$-NMR measurement. As a result, a chemical shift of a group (an alkyl group and the like) derived from the organic halide was detected.

Powder X-Ray Diffraction (XRD) Measurement

In the present specification, the powder X-ray diffraction (XRD) measurement was performed as follows.

A groove having a diameter of 20 mm, and a depth of 0.2 mm was filled with the powder of the sulfide solid electrolyte of Examples 6 and 8 and Comparative Example 1, followed by flattening with glass. Then, this was taken as a sample. This sample was sealed with a Kapton film for XRD and then was measured under the following conditions without contact with air.

Measurement device: M03xhf (model number, manufactured by Mac Science co., ltd.)
Tube voltage: 40 kV
Tube current: 40 mA
X-ray wavelength: Cu-Kα ray (1.5418 Å)
Optical system: concentration method
slit configuration: divergence slit 0.5°, scattering slit 0.5°, light receiving slit 0.3 mm, use of monochromator
detector: semiconductor detector
measurement range: 2θ=10-60 deg
step width, scanning speed: 0.05 deg, 10 sec/step

INDUSTRIAL APPLICABILITY

The modified sulfide solid electrolyte of the present embodiment is excellent in coating suitability when applied as a paste even if a sulfide solid electrolyte has a large specific surface area, and can efficiently exhibit an excellent battery performance. Further, the modified sulfide solid electrolyte of the present embodiment has a high ionic conductivity, and thus is suitably used for batteries, especially for batteries used for information-related equipment or communication equipment such as personal computers, video cameras, and mobile phones.

The invention claimed is:

1. A method of manufacturing a modified sulfide solid electrolyte, the method comprising:

mixing an organic halide and an organic solvent with a sulfide solid electrolyte having a BET specific surface area of 10 $m^2/g$ or more and containing a lithium atom, a sulfur atom, a phosphorus atom, and a halogen atom; and removing the organic solvent, wherein the organic halide is mixed in an amount of 0.75 parts by mole or more and 3.5 parts by mole or less with respect to 100 parts by mole of sulfur atoms contained in the sulfide solid electrolyte.

2. The method according to claim 1, wherein the organic halide is at least one compound selected from the group consisting of an organic halide 1 represented by formula (1), an organic halide 2 represented by formula (2), an organic halide 3 represented by formula (3), and an organic halide 4 represented by formula (4):

(1)

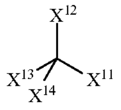

(2)

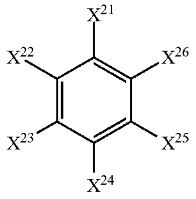

(3)

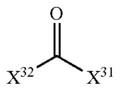

(3a)

$$—R^{31}—OR^{32}$$

(4)

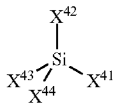

wherein in the formula (1), $X^{11}$ is a halogen atom selected from the group consisting of a chlorine atom, a bromine atom, and an iodine atom, each of $X^{12}$ to $X^{14}$ is independently a hydrogen atom, a halogen atom selected from the group consisting of a fluorine atom, a chlorine atom, a bromine atom, and an iodine atom, a monovalent aliphatic hydrocarbon group having a hydrogen atom optionally substituted with a halogen atom selected from the group consisting of a fluorine atom, a chlorine atom, a bromine atom, and an iodine atom, or a monovalent alicyclic hydrocarbon group having a hydrogen atom optionally substituted with a halogen atom selected from the group consisting of a fluorine atom, a chlorine atom, a bromine atom, and an iodine atom;

in the formula (2), each of $X^{21}$ to $X^{26}$ is independently a hydrogen atom, a halogen atom, a monovalent aliphatic hydrocarbon group having a hydrogen atom optionally substituted with a halogen atom, or a monovalent alicyclic hydrocarbon group having a hydrogen atom optionally substituted with a halogen atom, with the proviso that at least one of $X^{21}$ to $X^{26}$ is a halogen atom or a group containing a halogen atom, the halogen atom for $X^{21}$ is an atom selected from the group consisting of a chlorine atom, a bromine atom, and an iodine atom, and the halogen atom for $X^{22}$ to $X^{26}$ is independently an atom selected from the group consisting of a fluorine atom, a chlorine atom, a bromine atom, and an iodine atom;

in the formula (3), each of $X^{31}$ and $X^{32}$ is independently a hydrogen atom, a halogen atom, a monovalent aliphatic hydrocarbon group having a hydrogen atom optionally substituted with a halogen atom, a monovalent alicyclic hydrocarbon group having a hydrogen atom optionally substituted with a halogen atom, or a group represented by formula (3a), where in the formula (3a), $R^{31}$ is a single bond or a divalent aliphatic hydrocarbon group and $R^{32}$ is a hydrogen atom, a halogen atom, or a monovalent aliphatic hydrocarbon group having a hydrogen atom optionally substituted with a halogen atom, a with the proviso that at least one of $X^{31}$ and $X^{32}$ is a halogen atom or a group containing a halogen atom, the halogen atom for $X^{31}$ is an atom selected from the group consisting of a chlorine atom, a bromine atom, and an iodine atom, and the halogen atom for $X^{32}$ is an atom selected from the group consisting of a fluorine atom, a chlorine atom, a bromine atom, and an iodine atom; and in the formula (4), each of $X^{41}$ to $X^{44}$ is independently a hydrogen atom, a halogen atom, a monovalent aliphatic hydrocarbon group having a hydrogen atom optionally substituted with a halogen atom, or a monovalent alicyclic hydrocarbon group having a hydrogen atom optionally substituted with a halogen atom, with the proviso that at least one of $X^{41}$ to $X^{44}$ is a halogen atom or a group containing a halogen atom, the halogen atom for $X^{41}$ is an atom selected from group consisting of a chlorine atom, a bromine atom, and an iodine atom, and the halogen atom for $X^{42}$ to $X^{44}$ is independently an atom selected from the group consisting of a fluorine atom, a chlorine atom, a bromine atom, and an iodine atom.

3. The method according to claim 1, wherein a halogen atom contained in the organic halide is at least one selected from the group consisting of a chlorine atom, a bromine atom, and an iodine atom.

4. The method according to claim 2, wherein the organic halide contains the organic halide 1 of the formula (1), in which $X^{11}$ is a halogen atom, $X^{12}$ is a monovalent aliphatic hydrocarbon group having 2 to 24 carbon atoms and a hydrogen atom optionally substituted with a halogen atom selected from the group consisting of a fluorine atom, a chlorine atom, a bromine atom, and an iodine atom, and $X^{13}$ and $X^{14}$ are hydrogen atoms.

5. The method according to claim 2, wherein the organic halide contains the organic halide 2 of the formula (2), in which each of $X^{21}$ to $X^{26}$ is independently a hydrogen atom, a halogen atom, or a monovalent halogenated hydrocarbon group having at least one hydrogen atom substituted with a halogen atom, and at least one of $X^{21}$ to $X^{26}$ is the monovalent halogenated hydrocarbon group.

6. The method according to claim 2, wherein the organic halide contains the organic halide 3 of the formula (3), in which $X^{31}$ is a halogen atom, and $X^{32}$ is a monovalent aliphatic hydrocarbon group having 2 or more carbon atoms and a hydrogen atom optionally substituted with a halogen atom or a group represented by the formula (3a).

7. The method according to claim 2, wherein the organic halide contains the organic halide 4 of the formula (4), in which $X^{41}$ is a group represented by a halogen atom and $X^{42}$ to $X^{44}$ are each independently a monovalent aliphatic hydrocarbon group having a hydrogen atom optionally substituted with a halogen atom.

8. The method according to claim 1, wherein the organic solvent is at least one solvent selected from the group consisting of an aliphatic hydrocarbon solvent, an alicyclic hydrocarbon solvent, an aromatic hydrocarbon solvent, an ether solvent, an ester solvent, and a nitrile solvent.

9. The method according to claim 1, wherein the organic halide is mixed in an amount of 0.75 parts by mole or more and 3.0 parts by mole or less with respect to 100 parts by mole of sulfur atoms contained in the sulfide solid electrolyte.

10. The method according to claim 1, wherein the sulfide solid electrolyte has a BET specific surface area of 100 $m^2/g$ or less.

11. The method according to claim 1, wherein the modified sulfide solid electrolyte has diffraction peaks at $2\theta=20.2°$ and $2\theta=23.6°$ in X-ray diffraction measurement using CuKα radiation.

12. The method according to claim 1, wherein the modified sulfide solid electrolyte contains three or more types of the halogen atom.

13. The method according to claim 1, further comprising: before mixing the organic halide and the organic solvent with the sulfide solid electrolyte, preparing the sulfide solid electrolyte by mixing two or more raw materials, which are compounds containing at least one atom of a lithium atom, a sulfur atom, a phosphorus atom, and a halogen atom, with a complexing agent to obtain a mixture; and heating the mixture.

14. A method of manufacturing a modified sulfide solid electrolyte, the method comprising:

mixing an organic halide and an organic solvent with a sulfide solid electrolyte having a BET specific surface area of 10 $m^2/g$ or more and containing a lithium atom, a sulfur atom, a phosphorus atom, and a halogen atom; and removing the organic solvent, wherein the organic halide is at least one compound selected from the group consisting of an organic halide 1 represented by formula (1), an organic halide 2 represented by formula (2), and an organic halide 3 represented by formula (3):

(1)

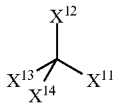

(2)

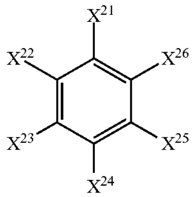

(3)

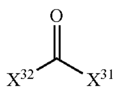

(3a)

$$-R^{31}-OR^{32}$$

(4)

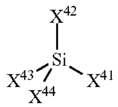

wherein in the formula (1), $X^{11}$ is a halogen atom selected from the group consisting of a chlorine atom, a bromine atom, and an iodine atom, each of $X^{12}$ to $X^{14}$ is independently a hydrogen atom, a halogen atom selected from the group consisting of a fluorine atom, a chlorine atom, a bromine atom, and an iodine atom, a monovalent aliphatic hydrocarbon group having a hydrogen atom optionally substituted with a halogen atom selected from the group consisting of a fluorine atom, a chlorine atom, a bromine atom, and an iodine atom, or a monovalent alicyclic hydrocarbon group having a hydrogen atom optionally substituted with a halogen atom selected from the group consisting of a fluorine atom, a chlorine atom, a bromine atom, and an iodine atom;

in the formula (2), each of $X^{21}$ to $X^{26}$ is independently a hydrogen atom, a halogen atom, a monovalent aliphatic hydrocarbon group having a hydrogen atom optionally substituted with a halogen atom, or a monovalent alicyclic hydrocarbon group having a hydrogen atom optionally substituted with a halogen atom, with the proviso that at least one of $X^{21}$ to $X^{26}$ is a halogen atom or a group containing a halogen atom, the halogen atom for $X^{21}$ is an atom selected from the group consisting of a chlorine atom, a bromine atom, and an iodine atom, and the halogen atom for $X^{22}$ to $X^{26}$ is independently an atom selected from the group consisting of a fluorine atom, a chlorine atom, a bromine atom, and an iodine atom; and in the formula (3), each of $X^{31}$ and $X^{32}$ is independently a hydrogen atom, a halogen atom, a monovalent aliphatic hydrocarbon group having a hydrogen atom optionally substituted with a halogen atom, a monovalent alicyclic hydrocarbon group having a hydrogen atom optionally substituted with a halogen atom, or a group represented by formula (3a), where in the formula (3a), $R^{31}$ is a single bond or a divalent aliphatic hydrocarbon group and $R^{32}$ is a hydrogen atom, a halogen atom, or a monovalent aliphatic hydrocarbon group having a hydrogen atom optionally substituted with a halogen atom, with the proviso that at least one of $X^{31}$ and $X^{32}$ is a halogen atom or a group containing a halogen atom, the halogen atom for $X^{31}$ is an atom selected from the group consisting of a chlorine atom, a bromine atom, and an iodine atom, and the halogen atom for $X^{32}$ is an atom selected from the group consisting of a fluorine atom, a chlorine atom, a bromine atom, and an iodine atom.

* * * * *